United States Patent
Mori et al.

(10) Patent No.: US 7,204,511 B2
(45) Date of Patent: *Apr. 17, 2007

(54) AIRBAG APPARATUS

(75) Inventors: Kenji Mori, Aichi-ken (JP); Hiroyuki Kobayashi, Aichi-ken (JP); Yuji Kuriyama, Aichi-ken (JP); Tadashi Yamamoto, Aichi-ken (JP); Toru Koyama, Aichi-ken (JP); Toshinori Tanase, Aichi-ken (JP); Masakazu Hashimoto, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/180,531

(22) Filed: Jul. 14, 2005

(65) Prior Publication Data

US 2005/0248131 A1 Nov. 10, 2005

Related U.S. Application Data

(63) Continuation of application No. 10/411,112, filed on Apr. 11, 2003, now Pat. No. 6,959,944.

(30) Foreign Application Priority Data

Apr. 11, 2002 (JP) .............................. 2002-109533
Apr. 11, 2002 (JP) .............................. 2002-109536

(51) Int. Cl.
*B60R 21/16* (2006.01)
(52) U.S. Cl. ..................................... 280/731
(58) Field of Classification Search ................ 280/731, 280/732, 735, 728.2
See application file for complete search history.

(56) References Cited

U.S. PATENT DOCUMENTS

| 3,481,626 | A | * | 12/1969 | Fergle ........................ 280/731 |
| 3,623,768 | A | | 11/1971 | Capener et al. |
| 5,026,092 | A | * | 6/1991 | Abramczyk ................. 280/777 |
| 5,074,583 | A | | 12/1991 | Fujita et al. |
| 5,295,712 | A | * | 3/1994 | Omura ....................... 280/777 |
| 5,324,071 | A | | 6/1994 | Gotomyo et al. |
| 5,344,184 | A | | 9/1994 | Keeler et al. |
| 5,505,487 | A | | 4/1996 | Brown et al. |
| 5,507,521 | A | | 4/1996 | Steffens, Jr. |

(Continued)

FOREIGN PATENT DOCUMENTS

DE 41 37 719 A1 11/1991

(Continued)

*Primary Examiner*—Faye M. Fleming
(74) *Attorney, Agent, or Firm*—Posz Law Group, PLC

(57) ABSTRACT

A first airbag apparatus of the present invention has an airbag module, which includes an airbag and an inflator, and a displacement mechanism, which displaces the airbag module. The displacement mechanism displaces the airbag module from an original position to a predetermined position when a collision of the vehicle is predicted and displaces the airbag module from the predetermined position to the original position when the predicted collision is avoided. A second airbag apparatus of the present invention has the airbag module and the displacement mechanism, which displaces a support member. The support member displaces the airbag from the original position to the predetermined position before the airbag is deployed. The deployed airbag is supported between the support body that is displaced to the predetermined position and an occupant.

2 Claims, 21 Drawing Sheets

U.S. PATENT DOCUMENTS

| | | |
|---|---|---|
| 5,730,458 A | 3/1998 | Byon |
| 5,738,369 A * | 4/1998 | Durrani ................... 280/731 |
| 5,842,717 A | 12/1998 | Wohllebe et al. |
| 5,848,803 A | 12/1998 | Tonooka et al. |
| 5,871,233 A | 2/1999 | Tanaka et al. |
| 5,897,135 A | 4/1999 | Oehm |
| 5,899,488 A | 5/1999 | Müller |
| 6,024,377 A | 2/2000 | Lane, Jr. |
| 6,189,920 B1 * | 2/2001 | Bayley ................... 280/731 |
| 6,315,321 B1 | 11/2001 | Lutz |
| 6,349,963 B1 | 2/2002 | Muller |
| 6,463,372 B1 | 10/2002 | Yokota et al. |
| 6,464,252 B1 | 10/2002 | Kreuzer |
| 6,527,295 B2 | 3/2003 | Muller |
| 6,581,959 B2 | 6/2003 | Muller |
| 6,755,273 B2 | 6/2004 | Breed |
| 6,910,715 B2 * | 6/2005 | Andersson ................ 280/777 |
| 6,983,954 B2 * | 1/2006 | Sakaguchi ............. 280/728.2 |
| 2001/0019204 A1 | 9/2001 | Reiter et al. |
| 2002/0163166 A1 | 11/2002 | Muller |
| 2005/0017484 A1* | 1/2005 | Worrell et al. ............. 280/731 |

FOREIGN PATENT DOCUMENTS

| | | |
|---|---|---|
| DE | 42 17 174 | 11/1993 |
| DE | 42 31 522 | 3/1994 |
| DE | 44 26 090 | 7/1995 |
| DE | 198 29 239 | 1/1999 |
| DE | 198 20 212 A1 | 11/1999 |
| DE | 198 53 322 A1 | 5/2000 |
| DE | 101 08 169 | 9/2002 |
| EP | 0 357 225 A1 | 7/1989 |
| EP | 1 234 731 | 2/2002 |
| JP | U-H05-5616 | 1/1993 |
| JP | A-H07-40800 | 2/1995 |
| JP | A-H07-125608 | 5/1995 |
| JP | A-H08-67226 | 3/1996 |
| JP | A-H09-142311 | 6/1997 |
| JP | A-H11-321552 | 11/1999 |
| JP | A-2000-177452 | 6/2000 |
| JP | A-2000-318623 | 11/2000 |
| JP | A-2001-206176 | 7/2001 |
| WO | WO 01/83272 A1 | 11/2001 |

\* cited by examiner

AIRBAG APPARATUS

CROSS REFERENCES TO RELATED APPLICATIONS

This application is a continuation of U.S. application Ser. No. 10/411,112, which was filed on 11 Apr. 2003 now U.S. Pat. No. 6,959,944 and titled Airbag Apparatus.

BACKGROUND OF THE INVENTION

As prior art airbag apparatus, Japanese Laid-Open Patent Publication No. 2001-206176 discloses an airbag apparatus 300 shown in FIGS. 29 to 31. As shown in FIG. 29, a first airbag module is provided in a door 210. The first airbag module includes a first inflator 288, a first airbag 282, and a contacting plate 286. When a collision of the vehicle is predicted based on detection by a pre-crash sensor (not shown), the first inflator 288 is activated to deploy the first airbag 282 toward the interior of a vehicle passenger compartment S as shown in FIG. 30. The deployment move.5 the contacting plate 286 toward the interior of the passenger compartment S and pushes an occupant toward the interior of the passenger compartment S.

A second airbag module is supported on the first airbag 282. The second airbag module includes a second inflator 290 and a second airbag 284. When the first airbag 282 is deployed, the second airbag module is pushed into the passenger compartment S. Thereafter, when a collision sensor (not shown) detects a collision of the vehicle, the second inflator 290 is activated and deploys the second airbag 284 between the occupant and the door 210 as shown in FIG. 31. This reduces the influence of the impact of the collision to the occupant.

The second airbag 284 is projected into the passenger compartment S in an undeployed state when the first airbag 282 is deployed. However, after being projected, the second airbag 284 is inflated on the unstable first airbag 282. Therefore, the second airbag 284, which chiefly protects the occupant, can be inflated at a position that is not suitable for protection. Even if the second airbag 284 is deployed at a position corresponding to the occupant, the second airbag 284 can be displaced due to contact with the occupant and therefore cannot effectively absorb the impact. Accordingly, the second airbag 284 cannot effectively protect the occupant under certain circumstances.

The second airbag 284 moves toward the center of the passenger compartment S by the deployment of the first airbag 282, based on the prediction of a collision. If the collision is prevented after that, the first airbag module needs to be replaced to return the undeployed second airbag 284 to the original position. However, it is almost impossible for an owner of the vehicle to replace the first airbag module.

SUMMARY OF THE INVENTION

Accordingly, it is an objective of the present invention to provide an airbag apparatus that permits an undeployed airbag that has been moved from the original position to return to the original position. Another objective of the present invention is to provide an airbag apparatus that expands an airbag in a suitable manner.

To achieve the above objective, the present invention provides an airbag apparatus mounted to a vehicle. The apparatus includes an airbag, an inflator, a first displacement mechanism, and a second displacement mechanism. The airbag is selectively displaced between an original position and a predetermined position. The airbag is initially undeployed. The inflator supplies gas into the airbag to deploy the airbag in a deployment direction. The first displacement mechanism displaces the undeployed airbag from the original position to the predetermined position when a collision of the vehicle is predicted. The second displacement mechanism displaces the undeployed airbag from the predetermined position to the original position.

The present invention also provides an airbag apparatus mounted to a vehicle. The apparatus includes an airbag, an inflator, a support body, and a displacement mechanism. The inflator supplies gas into the airbag to deploy the airbag. The support body supports the airbag when deployed and is selectively displaced between an original position and a predetermined position. The displacement mechanism displaces the support body from the original position to the predetermined position before the airbag is deployed. The deployed airbag is supported between the support body that is displaced to the predetermined position and an occupant.

A further aspect of the present invention is an airbag apparatus mounted to a vehicle. The apparatus includes an airbag, an inflator, a support body, and a displacement mechanism. The inflator supplies gas into the airbag to deploy the airbag. The support body supports the airbag when deployed. The displacement mechanism changes the relative position between the airbag and the support body from an original position to a predetermined position before the airbag is deployed. The deployed airbag is supported between the support body and an occupant in the predetermined position.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 4.

Figure 1:
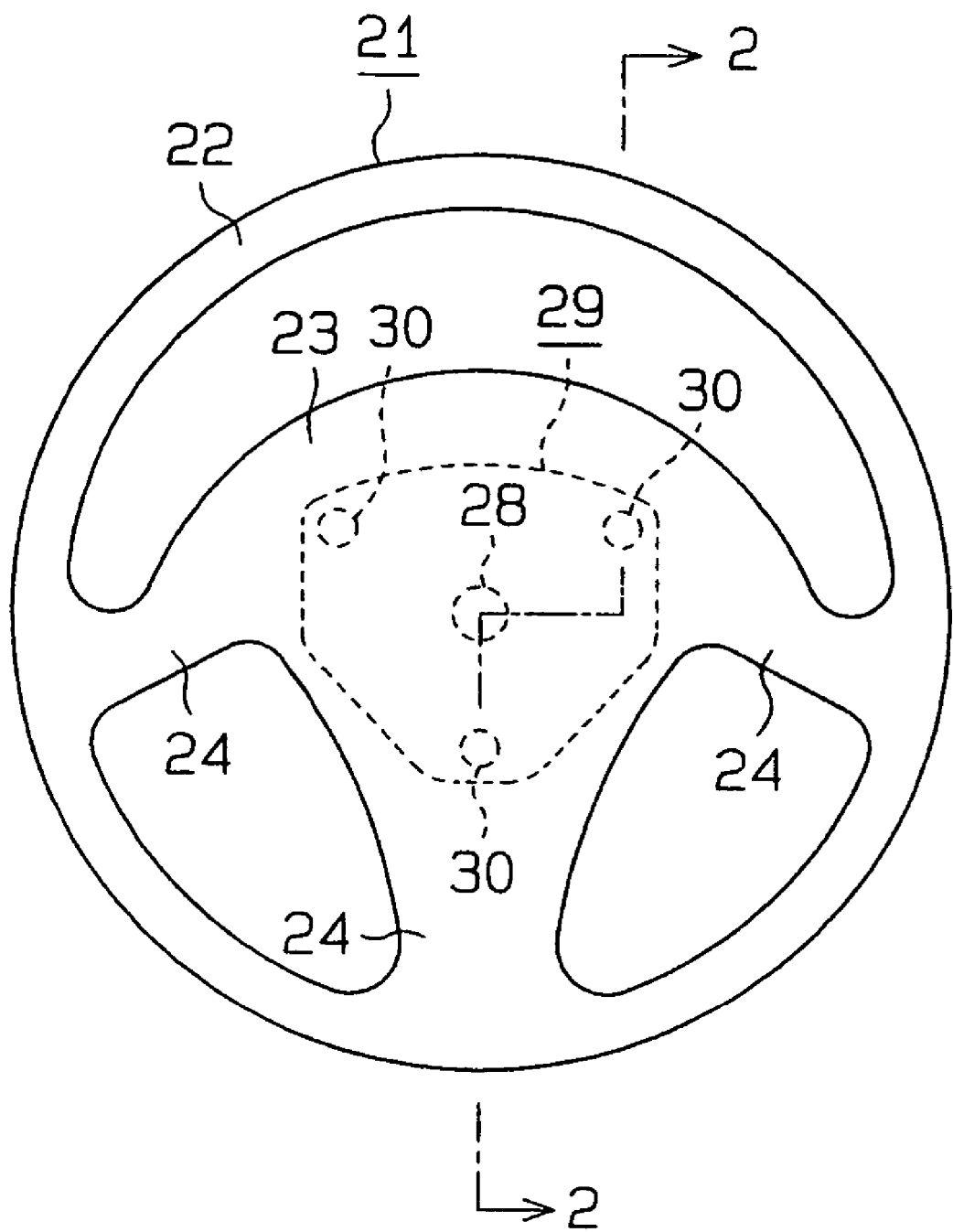
FIG. 1 is a front view illustrating a steering wheel that has an airbag apparatus according to a first embodiment of the present invention.
Figure 2:
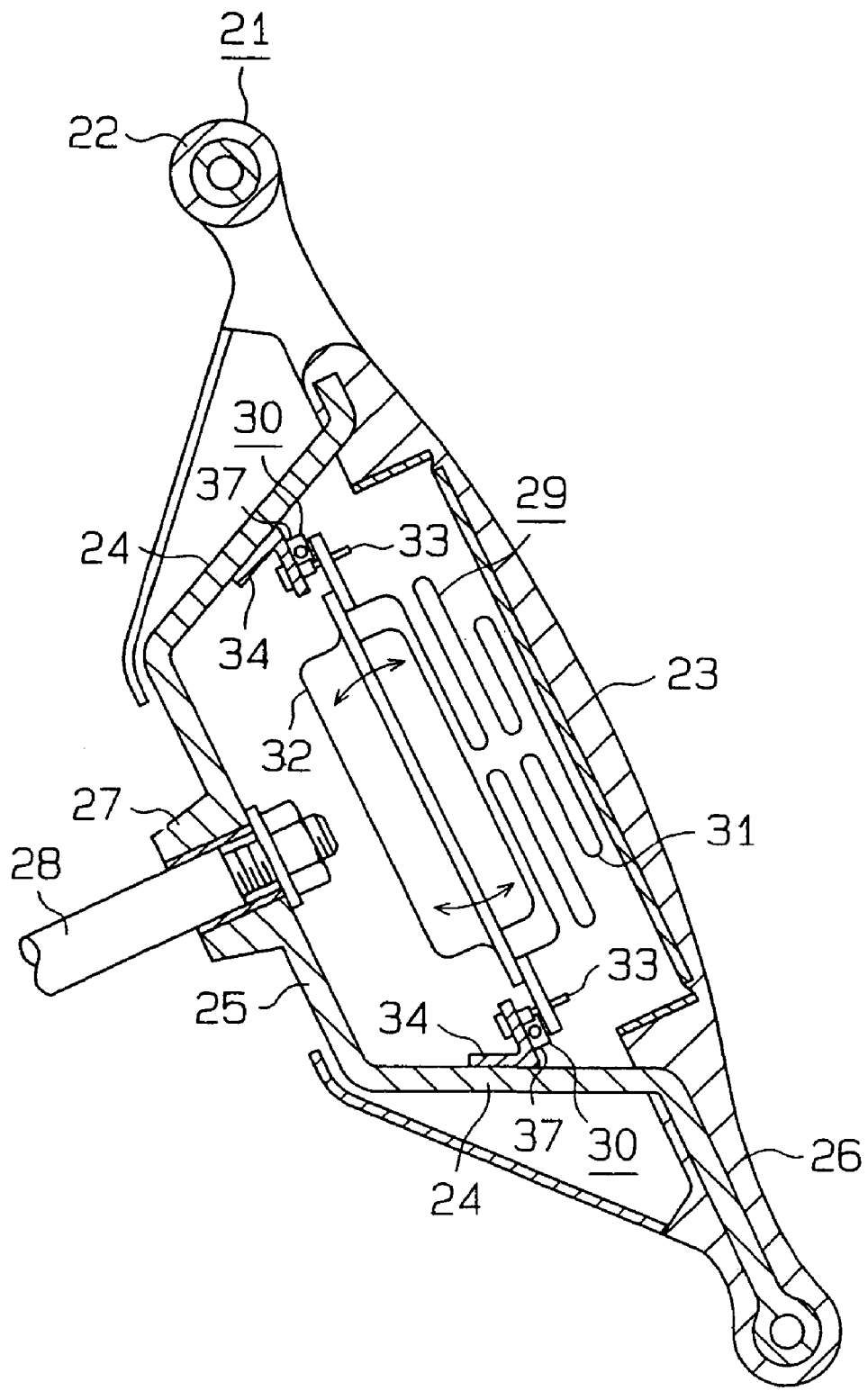
FIG. 2 is a cross-sectional view taken along line 2—2 in FIG. 1.

FIGS. 1 and 2 show a steering wheel 21. The steering wheel 21 is located inside a vehicle passenger compartment and includes a ring portion 22, a pad portion 23, and spoke portions 24 (three in the first embodiment). The pad portion 23 is located at the center of the ring portion 22. The spoke portions 24 connect the ring portion 22 with the pad portion 23. The steering wheel 21 includes a core 25 made of aluminum alloy and a core cover 26 made of soft synthetic resin. The core cover 26 covers the core 25. A fixing boss 27 is formed on part of the core 25, which is located at the center of the steering wheel 21. The steering wheel 21 is mounted to the distal end of a steering shaft 28 with the fixing boss 27.

The airbag module 29 is supported by three parts of the core 25 that are located about the airbag module 29 at 120 degrees intervals. The airbag module 29 is located inside the pad portion 23. Therefore, the airbag module 29 rotates integrally with the steering wheel 21. The airbag module 29 includes a folded airbag 31 and an inflator 32, which supplies gas to the airbag 31 to deploy the airbag 31. A slit (not shown) is formed on a portion of the surface of the pad portion 23 opposite to the airbag 31. The airbag 31 opens the surface of the pad portion 23 from the slit when deployed in expanded form to be exposed outside the pad portion 23.

Figure 3:
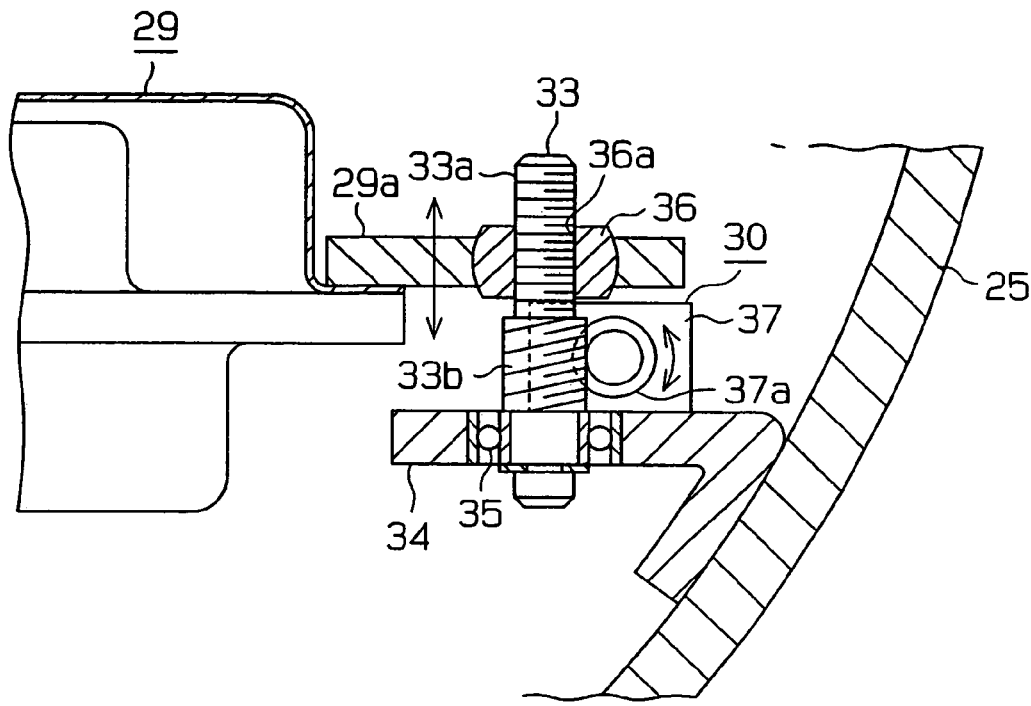
FIG. 3 is an enlarged partial cross-sectional view illustrating part of FIG. 2.

As shown in FIG. 3, brackets 29a are located at the portions of the core 25 that support the airbag module 29. Each bracket 29a rotatably supports a ball joint 36. A threaded bore 36a is formed at the center of each ball joint 36. A support plate 34 is secured to each part of the core 25 that supports the airbag module 29. Each support plate 34 rotatably supports a support shaft 33 via a bearing 35. Each support shaft 33 has a threaded portion 33a at the distal end and a worm wheel 33b at the axially middle portion. Each threaded portion 33a is screwed to the threaded bore 36a of the corresponding ball joint 36. Each support plate 34 supports a motor 37. A worm 37a, which engages with the worm wheel 33b of the corresponding support shaft 33, is formed on a rotary shaft of each motor 37. Therefore, each support shaft 33 rotates in accordance with rotation of the rotary shaft of the corresponding motor 37. When the support shaft 33 is rotated, the corresponding bracket 29a is shifted in the axial direction of the support shaft 33. Adjusting the position of each of the three brackets 29a with respect to the corresponding support shaft 33 causes the airbag module 29 to be displaced to change the direction inside the pad portion 23.

A displacement mechanism is formed of three shifting mechanisms 30. Each shifting mechanism 30 includes the bracket 29a, the support shaft 33, the support plate 34, the bearing 35, the ball joint 36, and the motor 37. The displacement mechanism displaces the airbag module 29. The airbag apparatus includes the airbag module 29 and the displacement mechanism.

Figure 4:
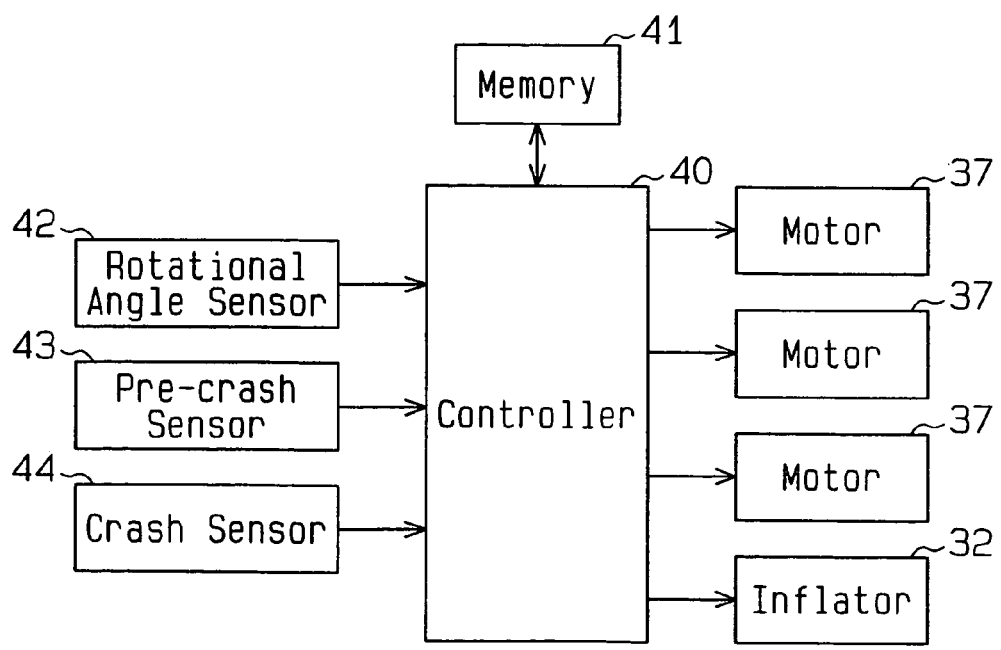
FIG. 4 is a block diagram showing parts of the airbag apparatus shown in FIG. 1 and parts relating to control of the airbag apparatus.

As shown in FIG. 4, a controller 40 is connected to the motors 37 and the inflator 32 to control the operation of the motors 37 and the inflator 32. The controller 40 is further connected to a memory 41, a rotational angle sensor 42, a pre-crash sensor 43, and a crash sensor 44. The memory 41 stores data regarding the deployment direction of the airbag 31 suitable for the rotational angle of the steering wheel 21. The rotational angle sensor 42 detects the rotational angle of the steering wheel 21 and sends a signal representing the rotational angle to the controller 40. The pre-crash sensor 43 is located at the front of a vehicle and emits ultrasonic wave or electric wave forward to detect an object, such as another vehicle, approaching the vehicle from the front. When detecting an object approaching the vehicle, the pre-crash sensor 43 sends a signal representing the distance between the object and the vehicle to the controller 40. The controller 40 determines the distance and the relative speed between the object and the vehicle and predicts the possibility of a collision between the object and the vehicle based on the signal sent from the pre-crash sensor 43. The crash sensor 44 is located at the front of the vehicle. When an impact greater than or equal to a predetermined value is applied to the front of the vehicle, the crash sensor 44 sends a signal representing the collision to the controller 40.

The airbag apparatus operates in the following manner. The airbag module 29 is normally located at an original position at which the deployment direction of the airbag 31 is oriented in the axial direction of the steering wheel 21. When predicting a collision via the pre-crash sensor 43, the controller 40 rotates each motor 37 in accordance with the rotational angle of the steering wheel 21 to displace the airbag module 29 in the optimal direction such that the deployment direction of the airbag 31 is oriented toward the driver's chest.

If a collision is detected by the crash sensor 44 subsequently, the controller 40 actuates the inflator 32. The airbag 31 is then deployed such that the airbag 31 is deployed toward the driver's chest. On the other hand, when a collision is avoided, that is, when a collision is not detected during a predetermined time from when a collision is predicted, the controller 40 rotates the motors 37 and restores the airbag module 29 to the original position.

If a collision is detected without any prediction of a collision for some reason, the controller 40 deploys the airbag 31, expanding it with the airbag module 29 located at the original position.

The first embodiment provides the following advantages.

(1) When a collision is predicted, the airbag module 29 is displaced in the optimal direction such that the deployment direction of the airbag 31 is directed toward the driver's chest. Therefore, if a collision is detected subsequently, the airbag 31 is deployed toward the driver's chest. Thus, the deployed airbag 31 effectively reduces the impact applied to the driver at a collision and reliably protects the driver from the impact of the collision.

(2) The airbag module 29 is displaced from the predetermined position to the original position when the predicted collision is avoided. That is, the airbag module 29, which includes the undeployed airbag 31, is allowed to easily return to the original position and prepare for a future collision.

(3) The displacement mechanism displaces the airbag module 29 from the predetermined position to the original position in addition to displacing the airbag module 29 from the original position to the predetermined position. That is, the displacement mechanism functions also as a restore mechanism, which restores the airbag module 29 from the predetermined position to the original position. This simplifies the structure of the displacement system of the airbag module 29.

A second embodiment of the present invention will now be described. The differences from the first embodiment will mainly be discussed below.

Figure 5:
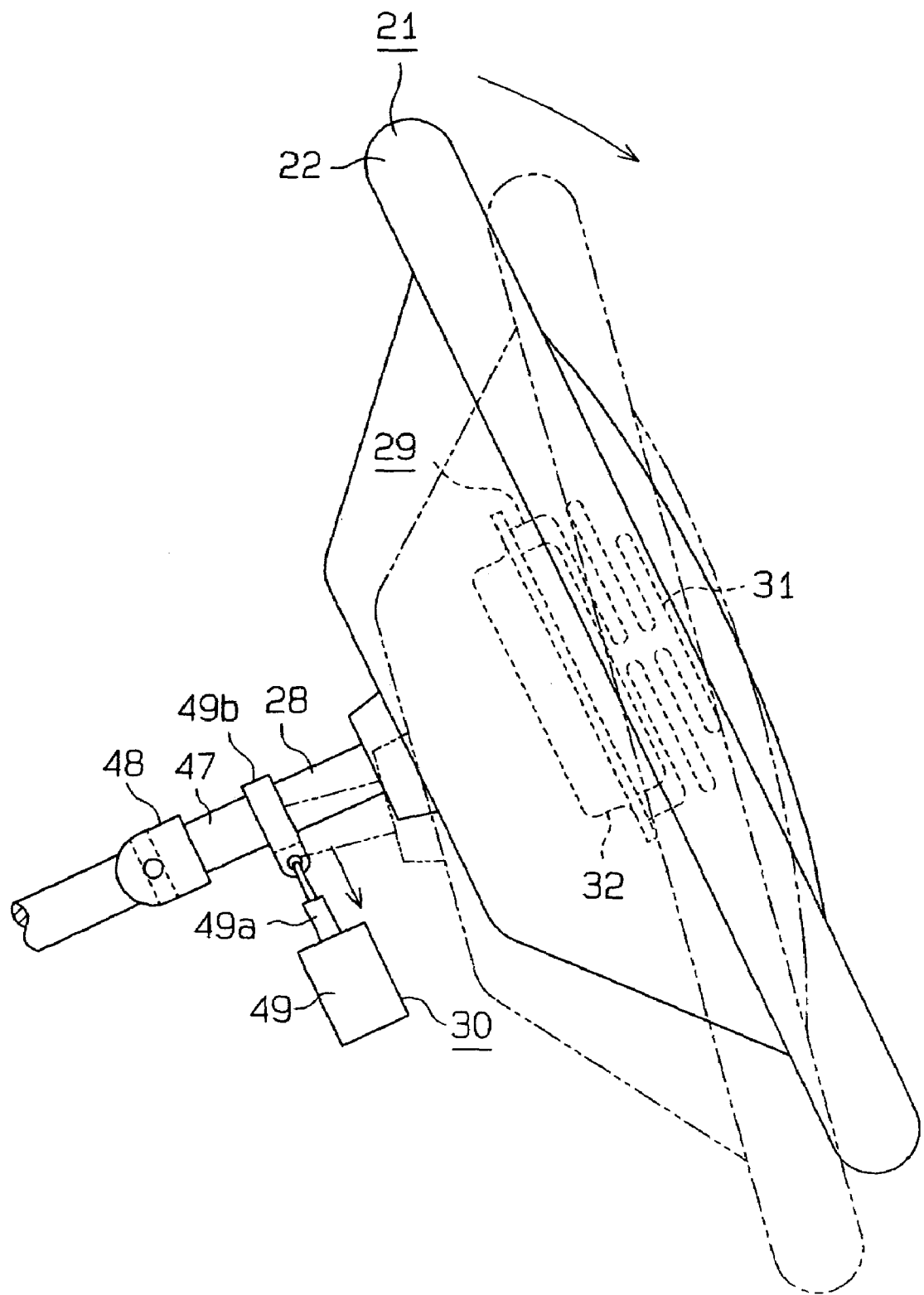
FIG. 5 is a side view illustrating a steering wheel that has an airbag apparatus according to a second embodiment of the present invention.

As shown in FIG. 5, the airbag module 29 according to the second embodiment is firmly secured to the steering wheel 21. A support column 47 extends from the proximal end of the steering shaft 28. The support column 47 can be bent at a joint portion 48 located at the axially middle portion of the support column 47. The angle of the steering wheel 21 changes in accordance with bending of the support column 47. A lock mechanism, which is not shown, locks the joint portion 48 to prevent the support column 47 from bending. The lock of the joint portion 48 by the lock mechanism is released when a collision is predicted by the pre-crash sensor 43.

A solenoid 49 is located below the steering wheel 21. A ring 49*b* is fitted to the distal end of the support column 47. The solenoid 49 has an armature 49*a*, which is coupled to the ring 49*b*. The solenoid 49 is connected to the controller 40 instead of the motors 37 shown in FIG. 4. A displacement mechanism according to the second embodiment, is formed by the shifting mechanism 30, which includes the joint portion 48 and the solenoid 49.

The steering wheel 21 and the airbag module 29 are normally located at an original position shown by a solid line in FIG. 5. If a collision is predicted by the pre-crash sensor 43, the controller 40 releases the lock mechanism. The controller 40 then excites the solenoid 49 to retract the armature 49*a*. The support column 47 is bent at the joint portion 48 to be arranged in a state shown by a chain double-dashed line in FIG. 5. As a result, the airbag module 29 is displaced to the optimal direction such that the deployment direction of the airbag 31 is oriented toward the driver's chest.

If a collision is detected by the crash sensor 44 subsequently, the controller 40 actuates the inflator 32. The airbag 31 is then deployed toward the driver's chest. On the other hand, if the predicted collision is avoided, the controller 40 extends the armature 49*a* of the solenoid 49 to restore the airbag module 29 to the original position.

The second embodiment provides the same advantages as the first embodiment.

A third embodiment of the present invention will now be described. The differences from the first embodiment will mainly be discussed below.

In the third embodiment, the pre-crash sensor 43 is located at a side portion of the vehicle. The pre-crash sensor 43 emits ultrasonic wave or electric wave laterally from the vehicle to detect an object, such as another vehicle, approaching the vehicle from sideways. The crash sensor 44 is located at a side portion of the vehicle. When an impact greater than or equal to a predetermined value is applied to the side portion of the vehicle, the crash sensor 44 sends a signal representing the collision to the controller 40.

Figure 6:
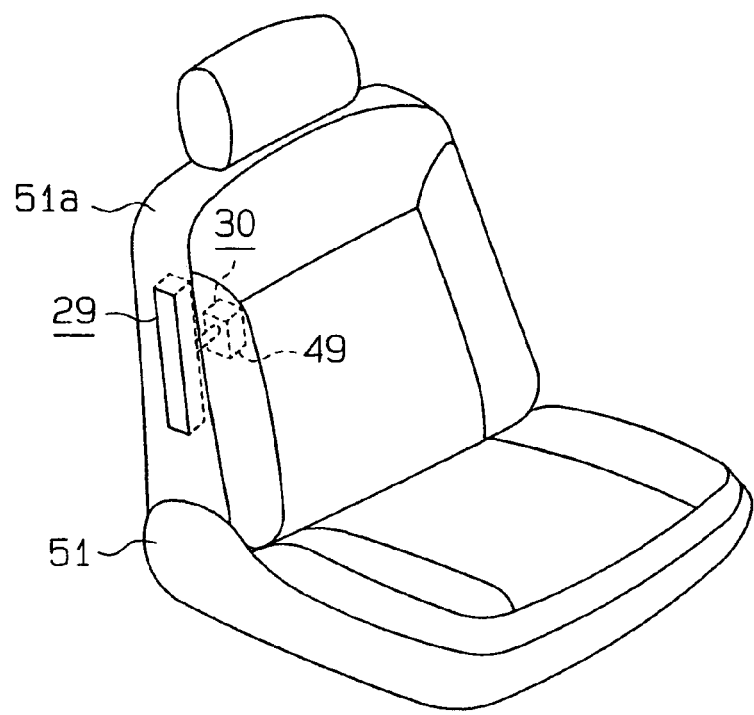
FIG. 6 is a perspective view illustrating a sheet that has an airbag apparatus according to a third embodiment of the present invention.
Figure 7:
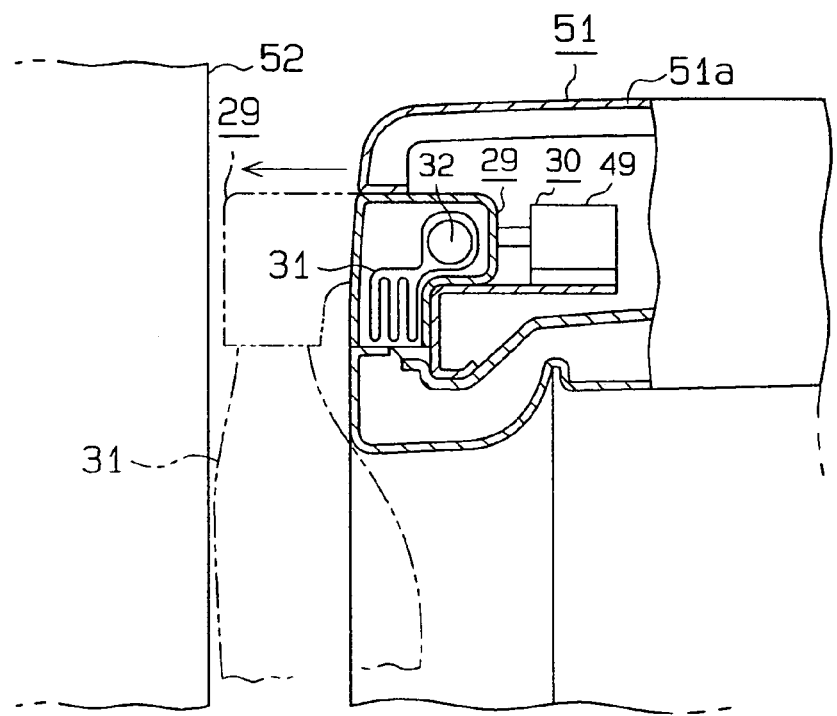
FIG. 7 is a front view, with a part cut away, illustrating the airbag apparatus shown in FIG. 6 and the vicinity of the airbag apparatus.

As shown in FIGS. 6 and 7, the airbag module 29 and the solenoid 49 are located in a backrest 51*a* of a seat 51 inside the vehicle passenger compartment. The airbag module 29 is coupled to an armature of the solenoid 49. The airbag module 29 selectively approaches and separates from a body side portion 52 of the vehicle in accordance with the extension and retraction of the armature. The solenoid 49 is connected to the controller 40 instead of the motors 37 shown in FIG. 4. A displacement mechanism according to the third embodiment is formed by the shifting mechanism 30, which includes the solenoid 49.

The airbag module 29 is normally located at a retracted position inside the backrest 51*a*, that is, an original position shown by a solid line in FIG. 7. If a collision is predicted by the pre-crash sensor 43, the controller 40 excites the solenoid 49 to extend the armature. Then, the airbag module 29 projects from the backrest 51*a* to approach the body side portion 52 as shown by a chain double-dashed line in FIG. 7. As a result, the deployment direction of the airbag 31 is oriented toward the space between the body side portion 52 and the occupant.

If a collision is detected by the crash sensor 44 subsequently, the controller 40 actuates the inflator 32. Then, the airbag 31 is deployed to expand toward the space between the body side portion 52 and the occupant. On the other hand, if the predicted collision is avoided, the controller 40 retracts the armature to restore the airbag module 29 to the original position.

The third embodiment provides the following advantages in addition to the advantages (2) and (3) of the first embodiment.

(4) If a collision is predicted, the airbag module 29 is displaced such that the deployment direction of the airbag 31 is oriented toward the space between the body side portion 52 and the occupant. Therefore, if a collision is detected subsequently, the airbag 31 is deployed toward the space between the body side portion 52 and the occupant. Thus, the deployed airbag 31 effectively reduces the impact applied to the occupant from the side of the vehicle at a collision and reliably protects the occupant from the impact of the collision.

A fourth embodiment of the present invention will now be described. The differences from the first embodiment will mainly be discussed below.

In the fourth embodiment, the pre-crash sensor 43 is located on both sides of the vehicle. Each pre-crash sensor 43 emits ultrasonic wave or electric wave toward the corresponding side of the vehicle to detect an object, such as another vehicle, approaching the vehicle from the corresponding side. The crash sensor 44 is located on both sides of the vehicle. Each crash sensor 44 sends a signal representing the collision to the controller 40 when an impact greater than or equal to a predetermined value is applied to the corresponding side of the vehicle.

Figure 8:
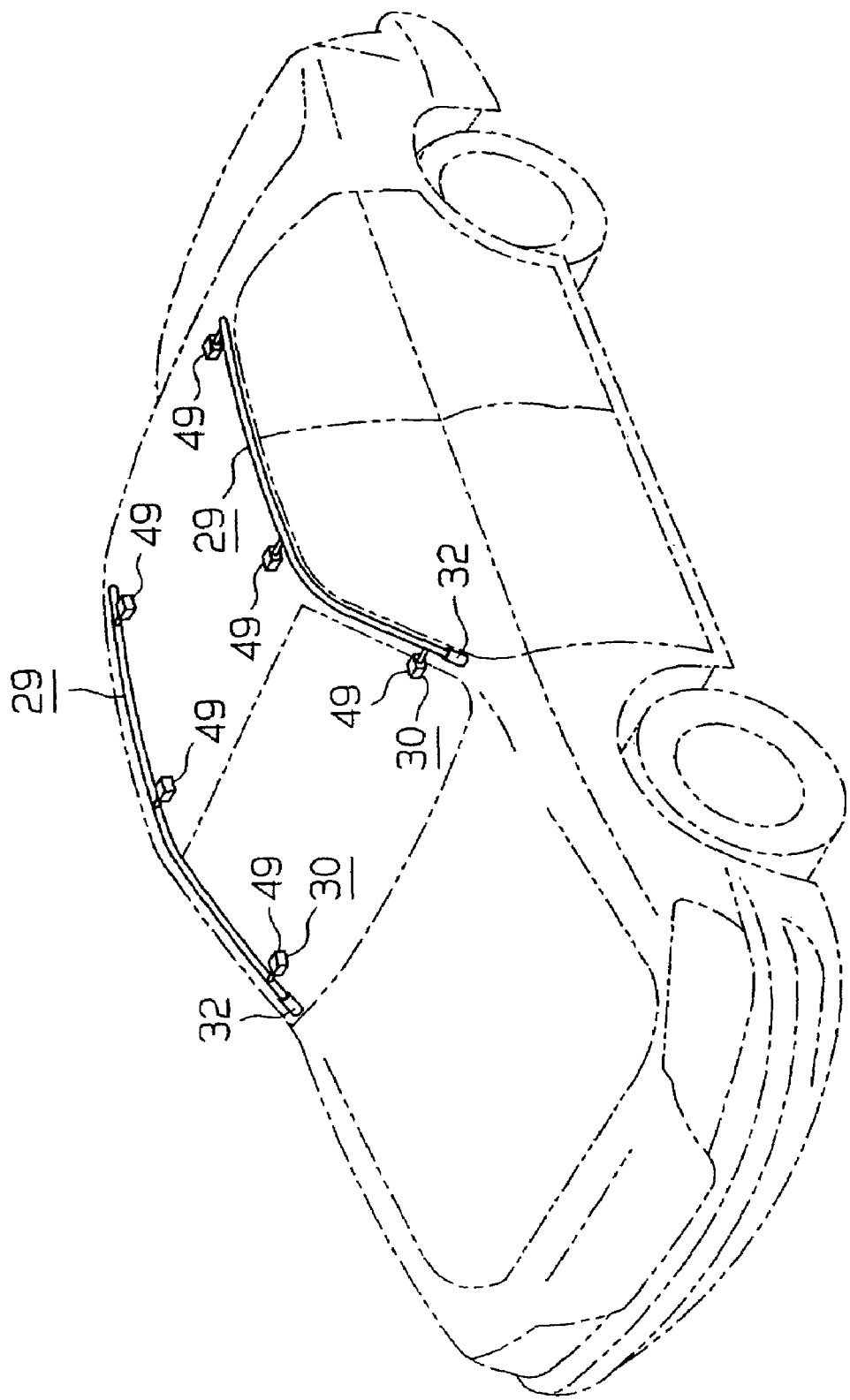
FIG. 8 is a perspective view illustrating a vehicle that has an airbag apparatus according to a fourth embodiment of the present invention.
Figure 9:
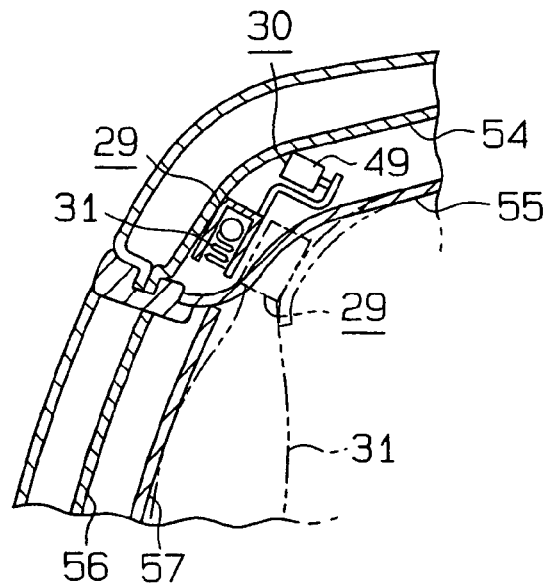
FIG. 9 is a cross-sectional view illustrating the airbag apparatus shown in FIG. 8 and the vicinity of the airbag apparatus.

As shown in FIGS. 8 and 9, the airbag module 29 and a set of solenoids 49 are located on each of the left and right sides of an inner roof 54. The airbag modules 29 and the sets of solenoids 49 are covered by a headlining 55 from below. Each set of solenoids 49 includes three solenoids 49. The armature of each solenoid 49 is coupled to the corresponding airbag module 29. Each airbag module 29 selectively approaches or separates from the center of the vehicle passenger compartment in accordance with the extension and retraction of the armatures of the corresponding set of solenoids 49. The solenoids 49 are connected to the controller 40 instead of the motors 37 shown in FIG. 4. A displacement mechanism according to the fourth embodiment is formed by the shifting mechanism 30, which includes the set of solenoids 49.

Each airbag module 29 is normally located at a retracted position inside the headlining 55, that is, an original position shown by a solid line in FIG. 9. If a collision is predicted by either of the pre-crash sensors 43, the controller 40 excites the corresponding set of solenoids 49 to extend their armatures 49a. Accordingly, the corresponding airbag module 29 pushes away the headlining 55 and moves toward the center of the vehicle passenger compartment as shown by a chain double dashed line in FIG. 9. As a result, the deployment direction of the associated airbag 31 is oriented toward the space between the occupant and a garnish 57, which covers a pillar 56.

If a collision is detected by either of the crash sensors 44 subsequently, the controller 40 actuates the corresponding inflator 32. The associated airbag 31 is then deployed toward the space between the corresponding garnish 57 and the occupant. On the other hand, if the predicted collision is avoided, the controller 40 retracts the armatures of the corresponding set of solenoids 49 to restore the airbag module 29 that has been displaced to the original position.

The occupant can return the headlining 55 that is pushed away when either one of the airbag modules 29 is shifted toward the center of the vehicle passenger compartment to the original position.

The fourth embodiment provides the following advantages in addition to the advantages (2) and (3) of the first embodiment and the advantage (4) of the third embodiment.

(5) If either inflator 32 is actuated while the corresponding airbag module 29 is at the original position, the associated airbag 31 interferes with the garnish 57 and is not deployed in an appropriate manner. However, since each airbag module 29 is shifted toward the center of the vehicle passenger compartment when a collision is predicted, each airbag 31 is prevented from interfering with the garnish 57.

A fifth embodiment of the present invention will now be described. The differences from the first embodiment will mainly be discussed below.

In the fifth embodiment, the pre-crash sensor 43 is located at the rear of the vehicle. The pre-crash sensor 43 emits ultrasonic wave or electric wave toward the rear of the vehicle to detect an object, such as another vehicle, approaching the vehicle from the rear. The crash sensor 44 is located at the rear of the vehicle. When an impact greater than or equal to a predetermined value is applied to the rear of the vehicle, the crash sensor 44 sends a signal representing the collision to the controller 40.

Figure 10:
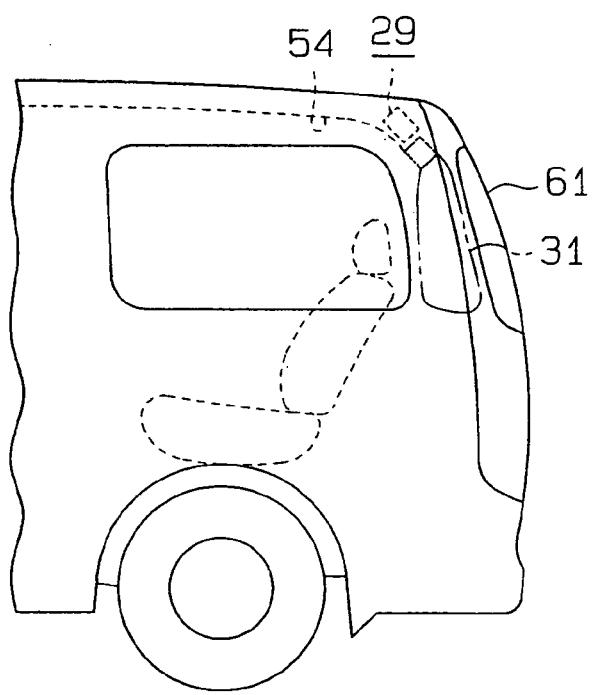
FIG. 10 is a partial side view illustrating a vehicle that has an airbag apparatus according to a fifth embodiment of the present invention.
Figure 11:
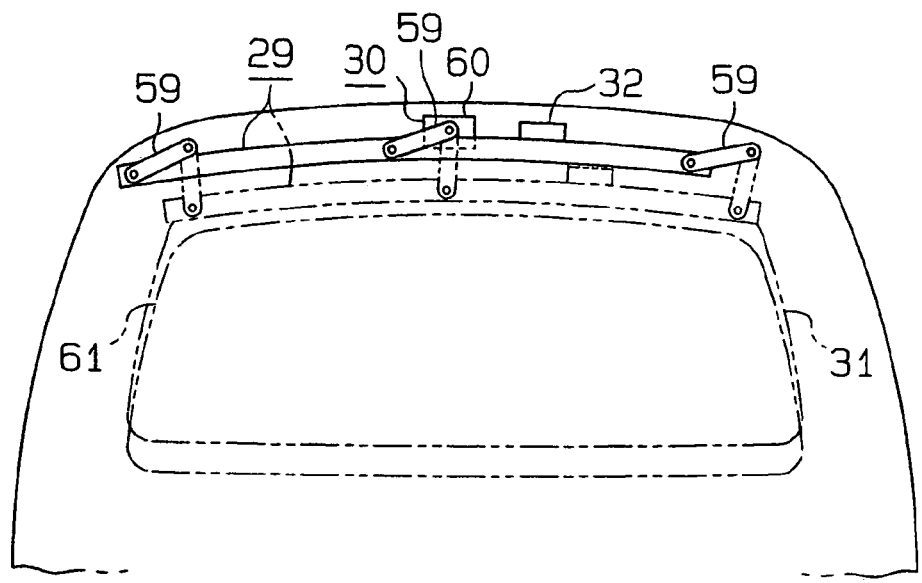
FIG. 11 is a partial rear view illustrating the vehicle shown in FIG. 10.
Figure 12:
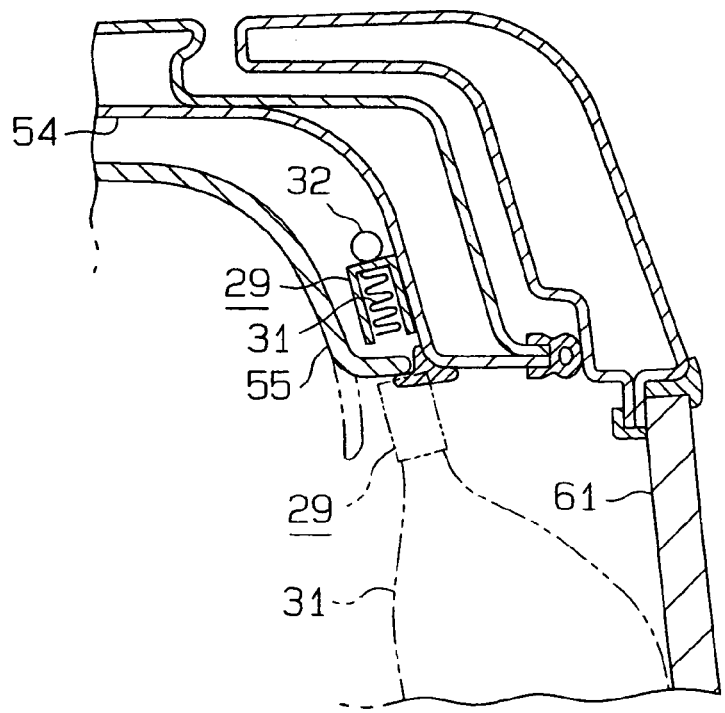
FIG. 12 is a cross-sectional view illustrating the airbag apparatus shown in FIG. 10 and the vicinity of the airbag apparatus.

As shown in FIGS. 10 to 12, the airbag module 29 and a rotary solenoid 60 are located at a portion of the inner roof 54 at the rear of the vehicle and are covered by the headlining 55 from below. The airbag module 29 is secured to the inner roof 54 with links 59. The airbag module 29 is coupled to a drive shaft of the rotary solenoid 60 with one of the links 59 and moves vertically in accordance with rotation of the drive shaft. The rotary solenoid 60 is connected to the controller 40 instead of the motors 37 shown in FIG. 4. A displacement mechanism according to the fifth embodiment is formed by the shifting mechanism 30, which includes the links 59 and the rotary solenoid 60.

The airbag module 29 is normally located at a retracted position inside the headlining 55, that is, an original position shown by a solid line in FIG. 12. If a collision is predicted by the pre-crash sensor 43, the controller 40 excites the rotary solenoid 60 to rotate the drive shaft. Accordingly, the airbag module 29 pushes away the headlining 55 and moves downward as shown by a chain double-dashed line in FIG. 12. As a result, the deployment direction of the airbag 31 is oriented in a direction parallel to the rear window 61.

If a collision is detected by the crash sensor 44 subsequently, the controller 40 actuates the inflator 32. The airbag 31 is then deployed along the rear window 61. On the other hand, if the predicted collision is avoided, the controller 40 releases the excitation of the rotary solenoid 60 to restore the airbag module 29 to the original position. The occupant can return the headlining 55 that is pushed away when the airbag module 29 is shifted downward to the original position.

The fifth embodiment provides the following advantages in addition to the advantages (2) and (3) of the first embodiment.

(6) If a collision is predicted, the airbag module 29 is displaced such that the deployment direction of the airbag 31 is oriented in a direction parallel to the rear window 61. Therefore, if a collision is detected subsequently, the airbag 31 is deployed along the rear window 61. Thus, the deployed airbag 31 effectively reduces an impact applied to the occupant from the rear of the vehicle at the collision and reliably protects the occupant from the impact of the collision.

A sixth embodiment of the present invention will now be described. The differences from the first embodiment will mainly be discussed below.

Figure 13:
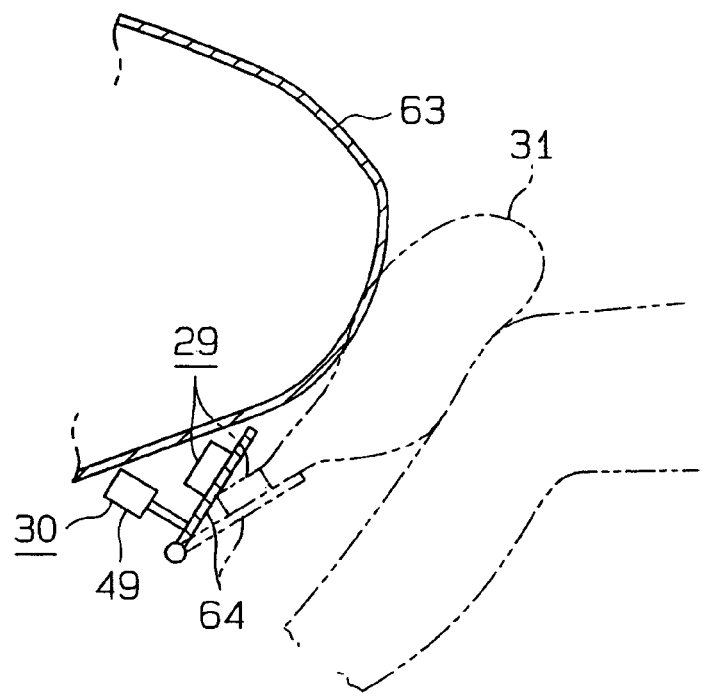
FIG. 13 is a cross-sectional view illustrating an airbag apparatus according to a sixth embodiment and the vicinity of the airbag apparatus.

As shown in FIG. 13, in the sixth embodiment, the airbag module 29 and the solenoid 49 are located below an instrument panel 63. The airbag module 29 is coupled to the armature of the solenoid 49 with a rotatable support plate 64. The airbag module 29 selectively approaches and separates from the legs of the occupant in accordance with the extension and retraction of the armature. The solenoid 49 is connected to the controller 40 instead of the motors 37 shown in FIG. 4. A displacement mechanism according to the sixth embodiment is formed by the shifting mechanism 30, which includes the solenoid 49 and the support plate 64.

The airbag module 29 is normally located at a position apart from the legs of the occupant, that is, an original position shown by a solid line in FIG. 13. If a collision is predicted by the pre-crash sensor 43, the controller 40 excites the solenoid 49 to extend the armature. Accordingly, the airbag module 29 approaches the legs of the occupant as shown by a chain double-dashed line in FIG. 13. As a result, the airbag 31 is oriented toward the vicinity of the knees of the occupant.

If a collision is detected by the crash sensor 44 subsequently, the controller 40 actuates the inflator 32. Then, the airbag 31 is deployed toward the vicinity of the knees of the occupant. On the other hand, if the predicted collision is avoided, the controller 40 retracts the armature of the solenoid 49 and restores the airbag module 29 to the original position.

The sixth embodiment provides the following advantages in addition to the advantages (2) and (3) of the first embodiment.

(7) If a collision is predicted, the airbag module 29 is displaced such that the deployment direction of the airbag 31 is oriented toward the vicinity of the knees of the occupant. Therefore, if a collision is detected subsequently, the airbag 31 is deployed toward the vicinity of the knees of the occupant. Thus, the deployed airbag 31 effectively protects the legs of the occupant from the impact of the collision.

A seventh embodiment of the present invention will now be described. The differences from the first embodiment will mainly be discussed below.

Figure 14:
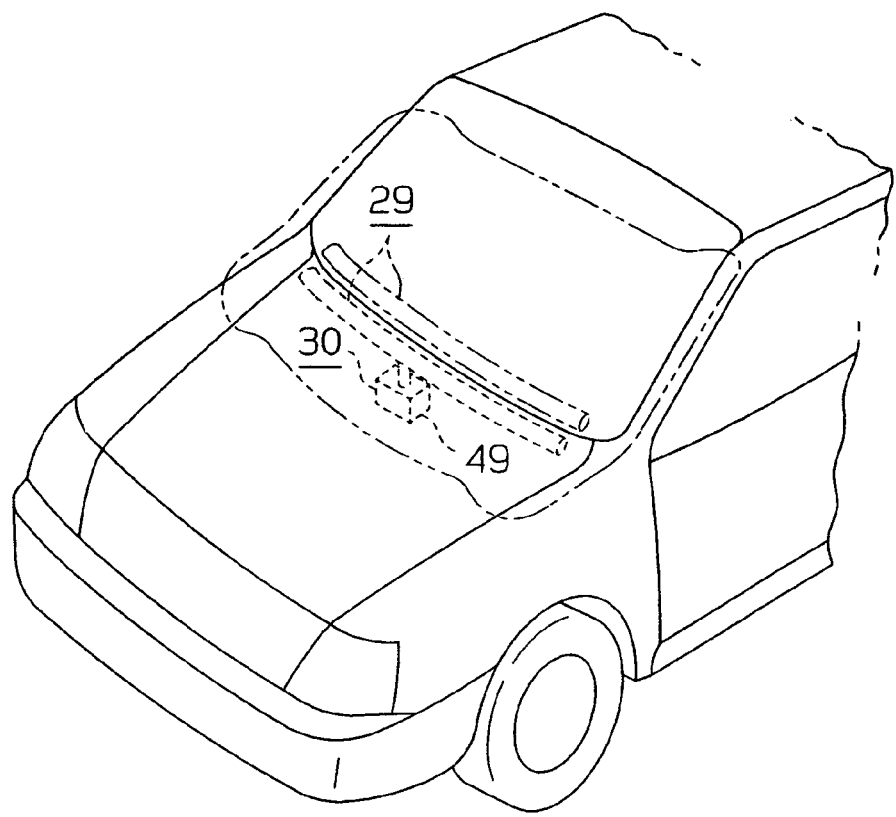
FIG. 14 is a partial perspective view illustrating a vehicle that has an airbag apparatus according to a seventh embodiment of the present invention.
Figure 15:
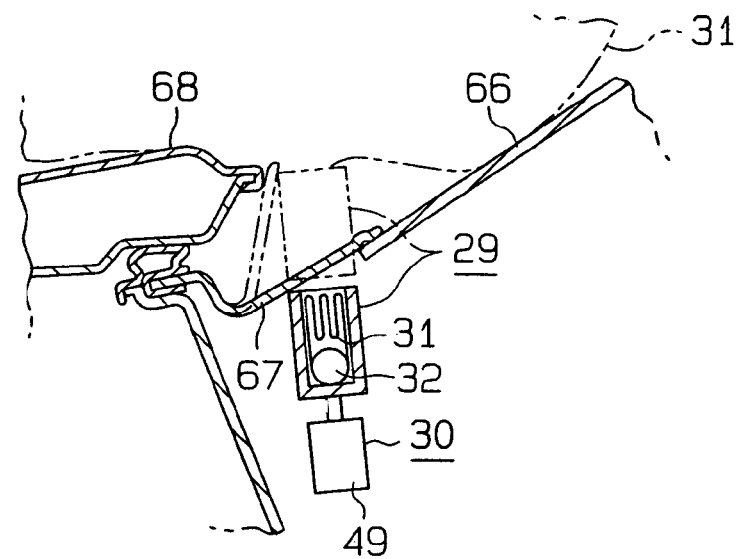
FIG. 15 is a cross-sectional view illustrating the airbag apparatus shown in FIG. 14 and the vicinity of the airbag apparatus.

As shown in FIGS. 14 and 15, in the seventh embodiment, the airbag module 29 and the solenoid 49 are located in the vicinity of the lower end of a front glass 66. A flexible cowl louver 67 covers the airbag module 29 from above. The airbag module 29 is coupled to the armature of the solenoid 49 and moves vertically in accordance with the extension and retraction of the armature. The solenoid 49 is connected to the controller 40 instead of the motors 37 shown in FIG. 4. A displacement mechanism according to the seventh embodiment is formed by the shifting mechanism 30, which includes the solenoid 49.

The airbag module 29 is normally located at a retracted position inside the cowl louver 67, that is, an original position shown by a solid line in FIG. 15. If a collision is predicted by the pre-crash sensor 43, the controller 40 excites the solenoid 49 to extend the armature. Accordingly, the airbag module 29 pushes away the cowl louver 67 and moves upward as shown by a chain double-dashed line in FIG. 15. As a result, the deployment direction of the airbag 31 is oriented toward a region from the rear upper portion of a hood panel 68 to the upper portion of the front glass 66.

If a collision is detected by the crash sensor 44 subsequently, the controller 40 actuates the inflator 32. The airbag 31 is then deployed toward the region. On the other hand, if the predicted collision is avoided, the controller 40 retracts the armature of the solenoid 49 and restores the airbag module 29 to the original position.

The seventh embodiment provides the following advantages in addition to the advantages (2) and (3) of the first embodiment.

(8) If a collision is predicted, the airbag module 29 is displaced such that the deployment direction of the airbag 31 is oriented toward the region from the rear upper portion of the hood panel 68 to the upper portion of the front glass 66. Therefore, if a collision is detected subsequently, the airbag 31 is deployed toward the region. Thus, if the vehicle runs over a pedestrian or crashes with a two-wheeled vehicle, the deployed airbag 31 prevents the pedestrian or a rider of the two-wheeled vehicle from hitting the rear portion of the hood panel 68 or the front glass 66. Consequently, the deployed airbag 31 effectively reduces the impact applied to a collision object when the vehicle crashes with the object and reliably protects the collision object from the impact of the collision.

An eighth embodiment of the present invention will now be described. The differences from the first embodiment will mainly be discussed below.

Figure 16:
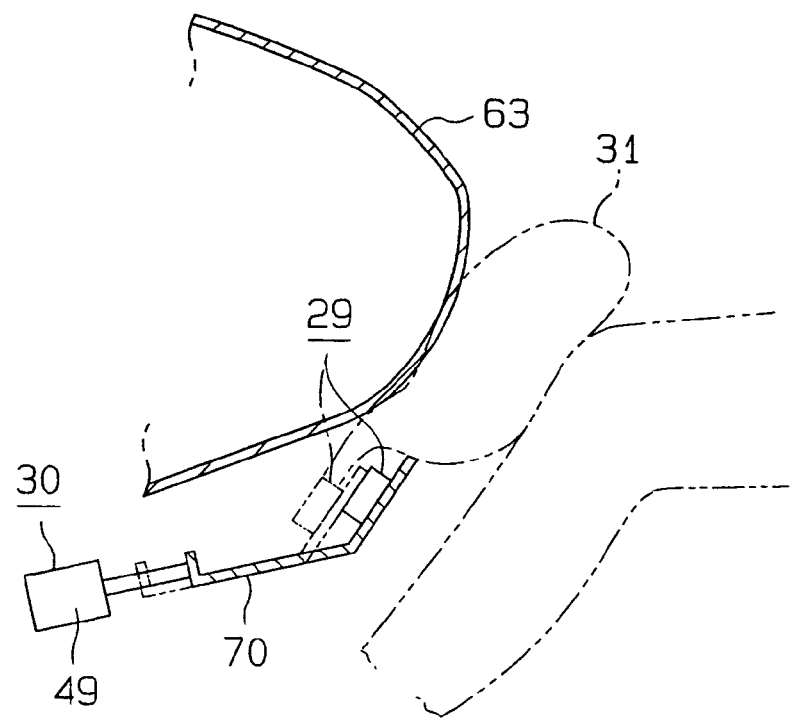
FIG. 16 is a cross-sectional view illustrating an airbag apparatus according to an eighth embodiment and the vicinity of the airbag apparatus.

As shown in FIG. 16, in the eighth embodiment, the airbag module 29 is supported by an under tray 70 located below the instrument panel 63. The under tray 70 is coupled to the armature of the solenoid 49 and reciprocates forward and backward. The airbag module 29 selectively approaches and separates from the legs of the occupant in accordance with the extension and retraction of the armature. The solenoid 49 is connected to the controller 40 instead of the motors 37 shown in FIG. 4. A displacement mechanism according to the eighth embodiment is formed by the shifting mechanism 30, which includes the solenoid 49 and the under tray 70.

The airbag module 29 is normally located at a position close to the legs of the occupant, that is, an original position shown by a solid line in FIG. 16. If a collision is predicted by the pre-crash sensor 43, the controller 40 excites the solenoid 49 to retract the armature. Accordingly, the airbag module 29 moves apart from the legs of the occupant as shown by a chain double-dashed line in FIG. 16. At this time, the airbag 31 is oriented toward the vicinity of the knees of the occupant.

If a collision is detected by the crash sensor 44 subsequently, the controller 40 actuates the inflator 32. The airbag 31 is then deployed toward the vicinity of the knees of the occupant. On the other hand, if the predicted collision is avoided, the controller 40 extends the armature of the solenoid 49 to restore the airbag module 29 to the original position.

The eighth embodiment provides the following advantages in addition to the advantages (2) and (3) of the first embodiment and the advantage (7) of the sixth embodiment.

(9) After predicting a collision, a relatively wide space is maintained between the airbag module 29 and the occupant. Therefore, the airbag 31 is efficiently deployed in the space during the actual collision to effectively protect the legs of the occupant.

A ninth embodiment of the present invention will now be described. The differences from the first embodiment will mainly be discussed below.

Figure 17:
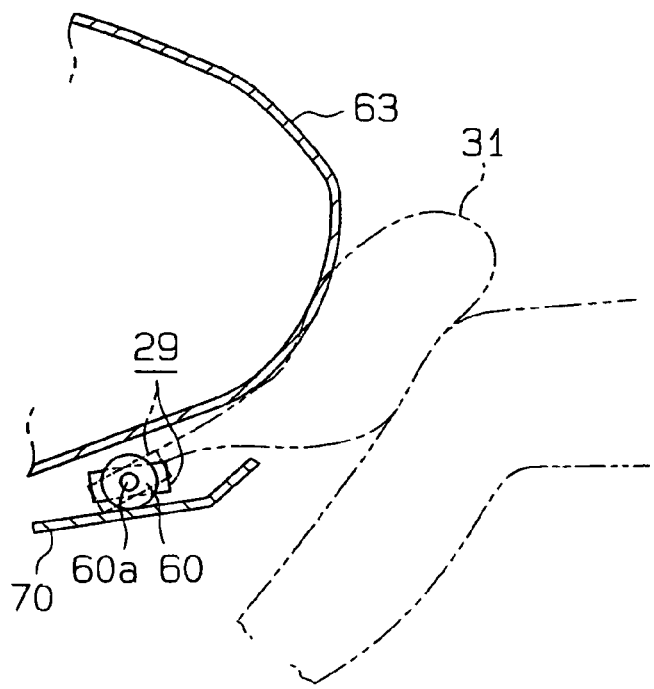
FIG. 17 is a cross-sectional view illustrating an airbag apparatus according to a ninth embodiment and the vicinity of the airbag apparatus.

As shown in FIG. 17, in the ninth embodiment, the rotary solenoid 60 is supported by the under tray 70 located below the instrument panel 63. The airbag module 29 is coupled to an output shaft 60a of the rotary solenoid 60 and rotates integrally with the output shaft 60a. The rotary solenoid 60 is connected to the controller 40 instead of the motors 37 shown in FIG. 4. A displacement mechanism according to the ninth embodiment is formed by the shifting mechanism 30, which includes the rotary solenoid 60.

The airbag module 29 is normally located at an original position shown by a solid line in FIG. 17. The deployment direction of the airbag 31 is oriented toward the substantially horizontal direction in the original position. If a collision is predicted by the pre-crash sensor 43, the controller 40 excites the rotary solenoid 60 to rotate the output shaft 60a. Accordingly, the airbag module 29 is rotated slightly upward from the original position as shown by a chain double-dashed line in FIG. 17. As a result, the deployment direction of the airbag 31 is oriented toward the vicinity of the knees of the occupant.

If a collision is detected by the crash sensor 44 subsequently, the controller 40 actuates the inflator 32. Then, the airbag 31 is deployed toward the vicinity of the knees of the occupant. On the other hand, if the predicted collision is avoided, the controller 40 releases the excitation of the rotary solenoid 60 and restores the airbag module 29 to the original position.

The ninth embodiment provides the same advantages as the sixth embodiment.

A tenth embodiment of the present invention will now be described. The differences from the first embodiment will mainly be discussed below.

Figure 18:
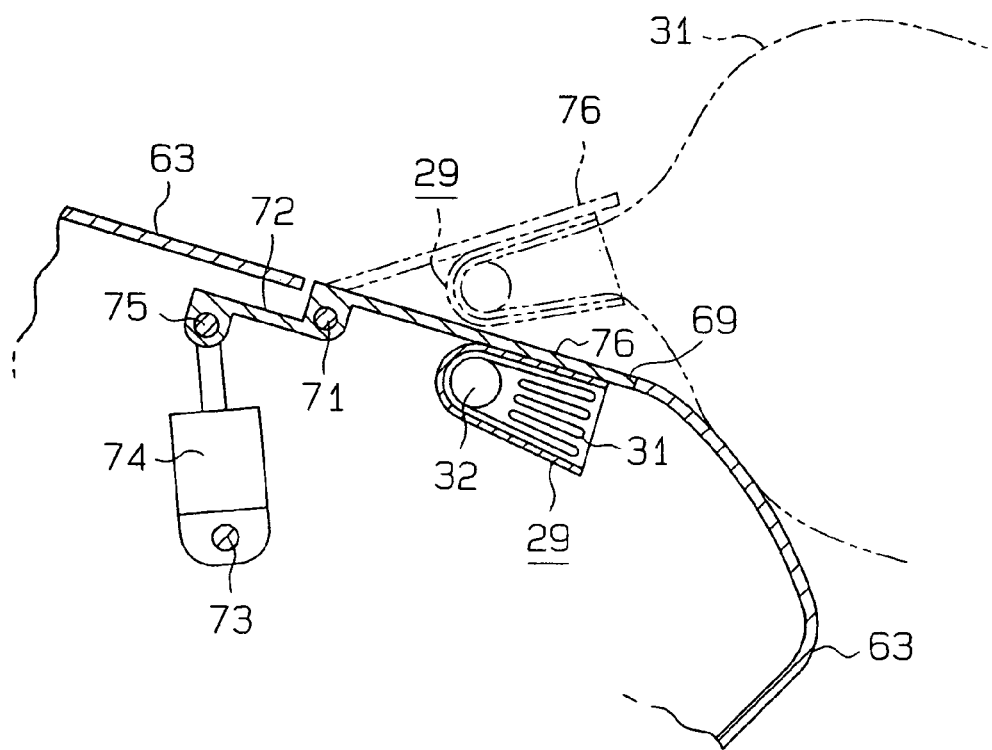
FIG. 18 is a cross-sectional view illustrating an airbag apparatus according to a tenth embodiment and the vicinity of the airbag apparatus.

As shown in FIG. 18, in the tenth embodiment, the airbag module 29 is mounted inside the instrument panel 63 on the passenger's side. The portion of the instrument panel 63 to which the airbag module 29 is mounted, or a lid 76, which closes an opening 69 located on the instrument panel 63, is rotatable about a first shaft 71. A hinge 72 extends from a portion of the lid 76 in the vicinity of the first shaft 71. A solenoid 74 is located inside the instrument panel 63 and is rotatably supported by a second shaft 73. The armature of the solenoid 74 is coupled to the hinge 72 with a third shaft 75. Therefore, when the solenoid 74 is excited to extend or retract the armature, the lid 76 is rotated about the first shaft 71, which causes the airbag module 29 to be displaced. The solenoid 74 is connected to the controller 40 instead of the motors 37 shown in FIG. 4. A displacement mechanism according to the tenth embodiment is formed by the shifting mechanism 30, which includes the first shaft 71, the hinge 72, the third shaft 75, the lid 76, and the solenoid 74.

The airbag module 29 is normally located at a retracted position inside the instrument panel 63, that is, an original position shown by a solid line in FIG. 18. If a collision is predicted by the pre-crash sensor 43, the controller 40 excites the solenoid 74 to retract the armature. Accordingly, the lid 76 is rotated and the airbag module 29 is exposed outside the instrument panel 63 as shown by a chain double-dashed line in FIG. 18. As a result, the deployment direction of the airbag 31 is oriented toward the chest of the occupant in the passenger's seat.

If a collision is detected by the crash sensor 44 subsequently, the controller 40 actuates the inflator 32. Then, the airbag 31 is deployed toward the chest of the occupant in the passenger's seat. On the other hand, if the predicted collision is avoided, the controller 40 extends the armature of the solenoid 74 and restores the airbag module 29 to the original position.

The tenth embodiment provides the following advantages in addition to the advantages (2) and (3) of the first embodiment.

(10) If a collision is predicted, the airbag module 29 is displaced such that the deployment direction of the airbag 31 is oriented toward the chest of the occupant in the passenger's seat. Therefore, if a collision is detected subsequently, the airbag 31 is deployed toward the chest of the occupant in the passenger's seat. Thus, the deployed airbag 31 effectively reduces the impact applied to the occupant in the passenger's seat at the collision and reliably protects the occupant in the passenger's seat from the impact of the collision.

An eleventh embodiment of the present invention will now be described with reference to FIGS. 19 to 22. The eleventh embodiment has substantially the same structure as the second embodiment shown in FIG. 5. The functions that are not explained in the second embodiment will be discussed below.

Figure 19:
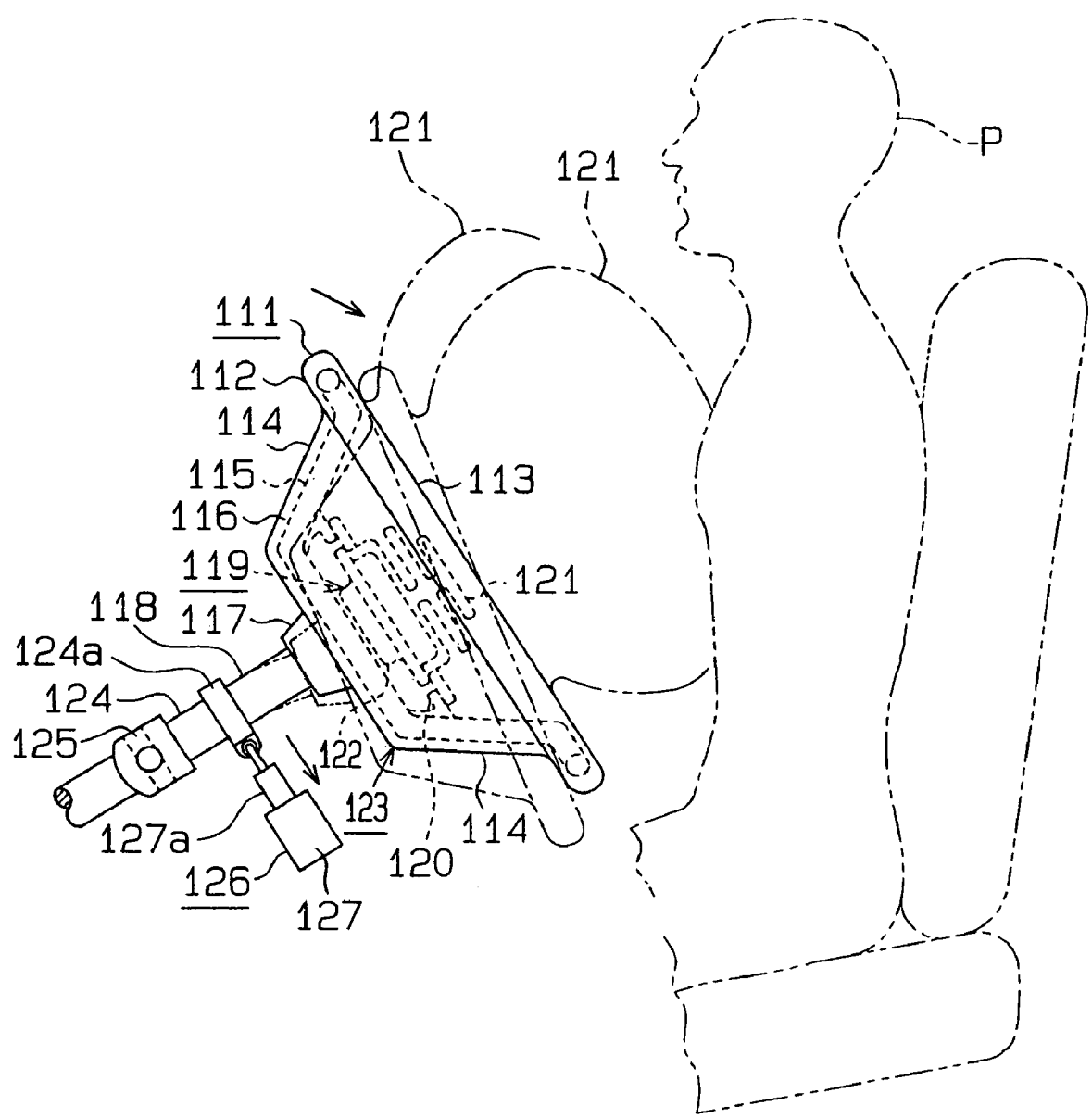
FIG. 19 is a side view illustrating an airbag apparatus according to an eleventh embodiment and the vicinity of the airbag apparatus.
Figure 20:
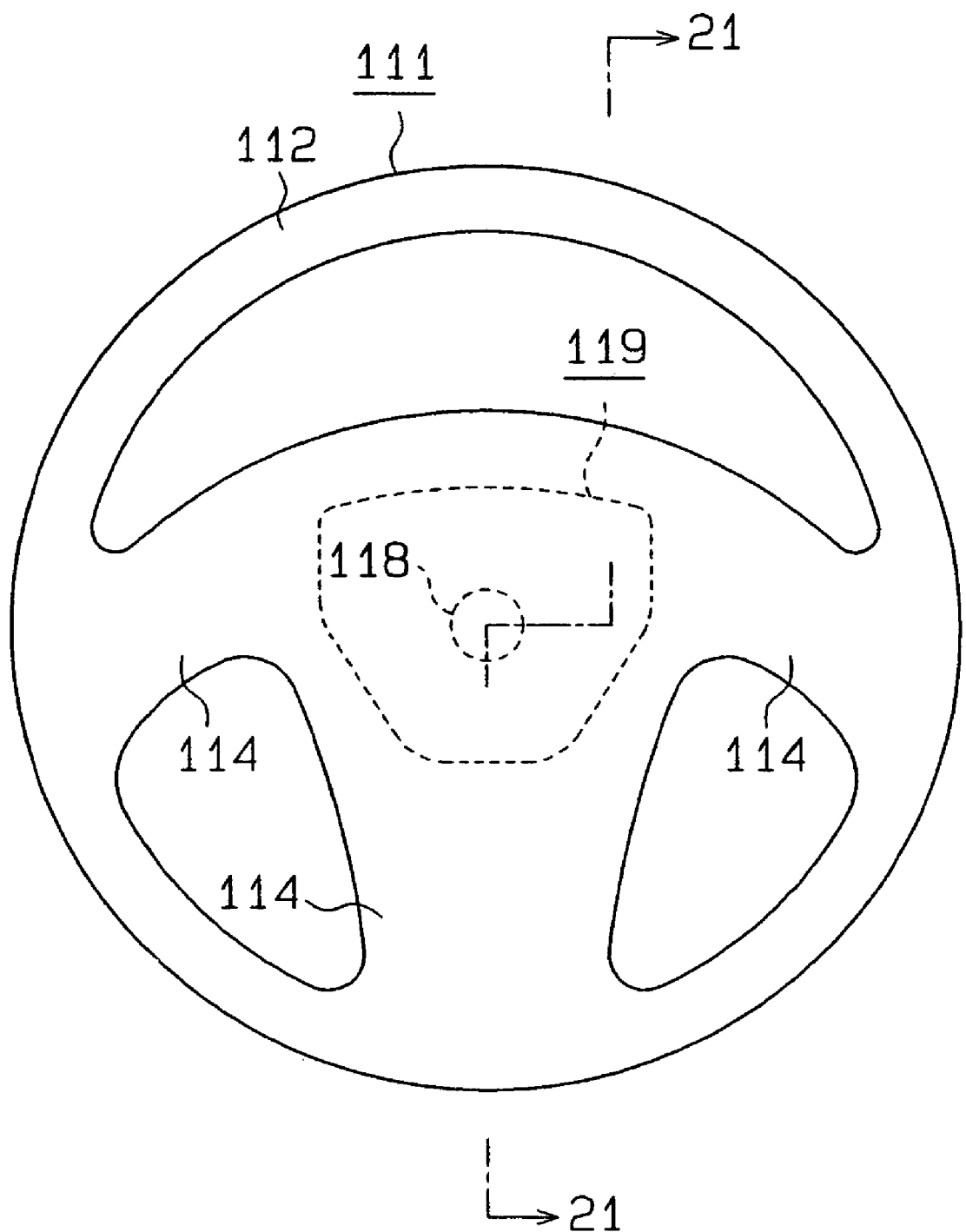
FIG. 20 is a front view illustrating the steering wheel shown in FIG. 19.
Figure 21:
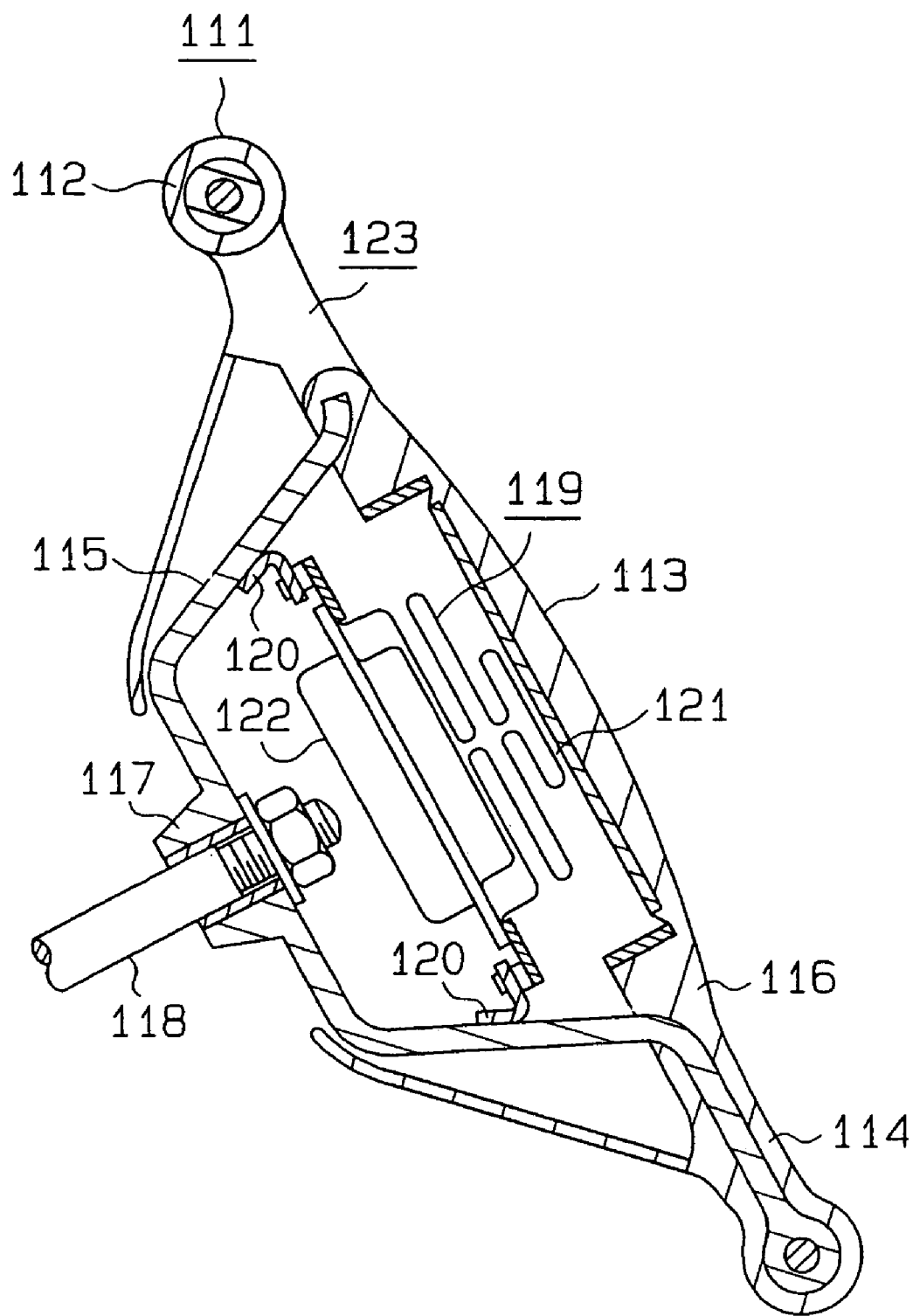
FIG. 21 is a cross-sectional view taken along line 21—21 in FIG. 20.

As shown in FIGS. 19 to 21, a steering wheel 111 is located inside a vehicle passenger compartment and includes a ring portion 112, a pad portion 113, and spoke portions 114. The pad portion 113 is located at the center of the ring portion 112. The spoke portions 114 connect the ring portion 112 with the pad portion 113. The steering wheel 111 includes a core 115 made of aluminum alloy and a core cover 116 made of soft synthetic resin. The core cover 116 covers the core 115. A fixing boss 117 is formed on part of the core 115, which is located at the center of the steering wheel 111. The steering wheel 111 is mounted to the distal end of a steering shaft 118 with the fixing boss 117.

An airbag module 119 is supported by the core 115 via a mounting plate 120 and is located inside the pad portion 113. The airbag module 119 includes a folded airbag 121 and an inflator 122, which supplies gas to the airbag 121 to deploy the airbag 121.

As shown in FIG. 19, a support column 124 extends from the proximal end of the steering shaft 118 and can be bent at a joint portion 125 located at the axially middle portion. A solenoid 127 is located below the steering wheel 111. An armature 127a of the solenoid 127 is coupled to a ring 124a, which is fitted to the distal end of the support column 124.

When the airbag 121 is deployed, the deployed airbag 121 is supported between the steering wheel 111 (particularly the ring portion 112 and the spoke portions 114) and an occupant P in the driver's seat (or a driver). That is, the steering wheel 111 functions as a support body 123 for supporting the deployed airbag 121 against the occupant P. A displacement mechanism according to the eleventh embodiment is formed by a shifting mechanism 126, which includes the joint portion 125 and the solenoid 127, and displaces the support body 123. The airbag apparatus includes the airbag module 119, the support body 123, and the displacement mechanism.

Figure 22:
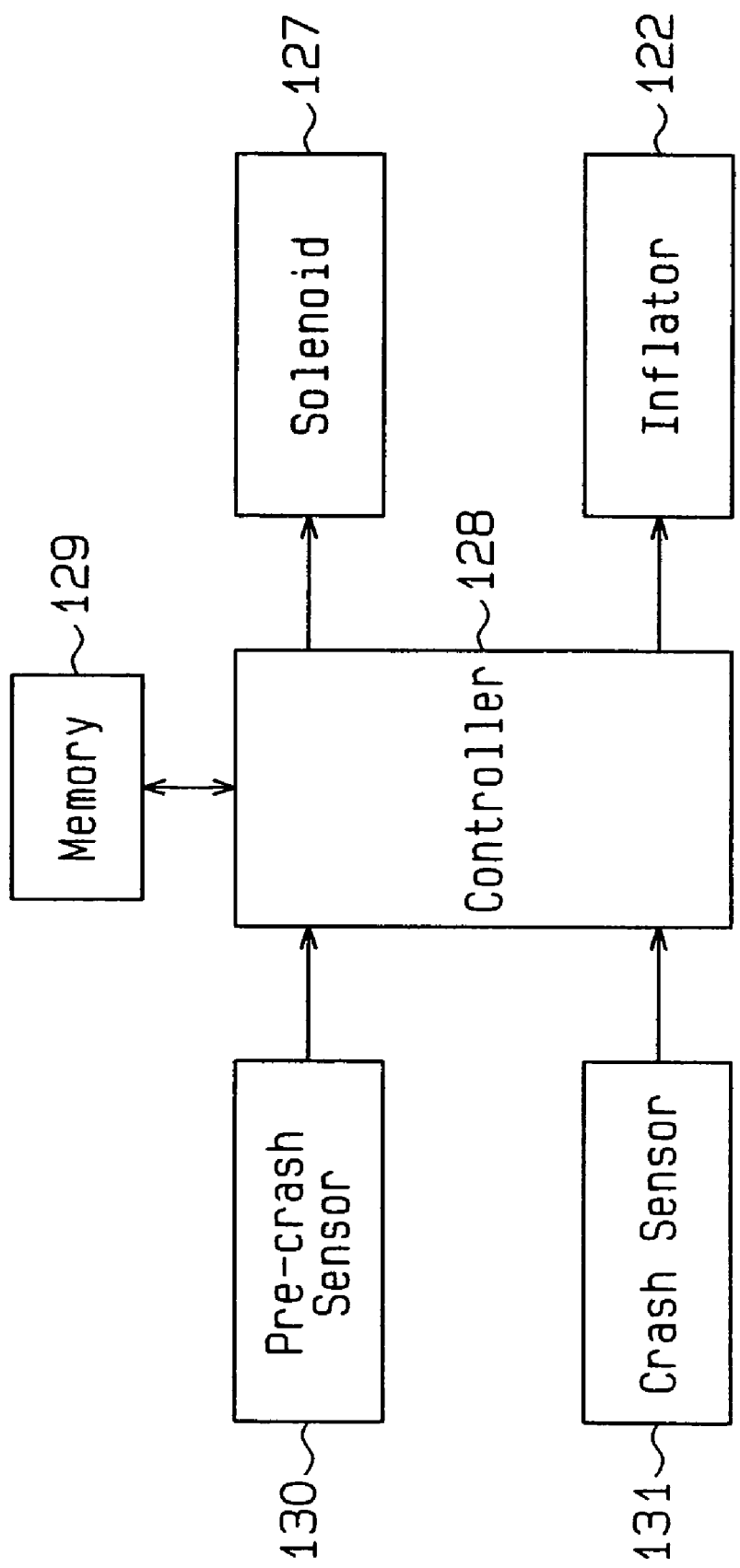
FIG. 22 is a block diagram showing parts of the airbag apparatus shown in FIG. 19 and parts relating to the control of the airbag apparatus.

As shown in FIG. 22, a controller 128 is connected to the solenoid 127 and the inflator 122 and controls the operation of the solenoid 127 and the inflator 122. The controller 128 is further connected to a memory 129, a pre-crash sensor 130, and a crash sensor 131. The memory 129 stores data regarding control of the solenoid 127 and the inflator 122. The pre-crash sensor 130 is located at the front of a vehicle and emits ultrasonic wave or electric wave forward to detect an object, such as another vehicle, approaching the vehicle from the front. When detecting an object approaching the vehicle, the pre-crash sensor 130 sends a signal representing the distance between the object and the vehicle to the controller 128. The controller 128 determines the distance and the relative speed between the object and the vehicle and predicts the possibility of a collision between the object and the vehicle based on the signal sent from the pre-crash sensor 130. The crash sensor 131 is located at the front of the vehicle. When an impact greater than or equal to a predetermined value is applied to the front of the vehicle, the crash sensor 131 sends a signal representing the collision to the controller 128.

The airbag apparatus operates in the following manner. The steering wheel 111 is normally located at an original position shown by a solid line in FIG. 19. When predicting a collision by the pre-crash sensor 130, the controller 128 excites the solenoid 127 to retract the armature 127a. Accordingly, the support column 124 is bent at the joint portion 125 so that the steering wheel 111 tilts as shown by a chain double-dashed line in FIG. 19 to face the chest of the occupant P.

If a collision is detected by the crash sensor 131 subsequently, the controller 128 actuates the inflator 122. The airbag 121 is then deployed toward the chest of the occupant P. The deployed airbag 121 is supported between the steering wheel 111 and the chest of the occupant P. On the other hand, if the predicted collision is avoided, the controller 128 extends the armature 127a of the solenoid 127 to restores the steering wheel 111 to the original position.

If a collision is detected without any prediction of a collision for some reason, the controller 128 deploys the airbag 121 with the steering wheel 111 located at the original position.

The eleventh embodiment provides the following advantages in addition to the advantages of the second embodiment.

(11) If a collision is predicted, the steering wheel 111 is displaced to face the chest of the occupant P in the driver's seat. Therefore, the deployed airbag 121 is stably supported between the steering wheel 111 and the chest of the occupant P. This prevents the airbag 121 from bouncing back from the chest of the occupant P and being displaced to an unsuitable position. Thus, the deployed airbag 121 effectively reduces the impact applied to the occupant P at the collision and reliably protects the occupant P from the impact of the collision.

(12) When a collision is predicted, the steering wheel 111 is displaced from the original position to the predetermined position and when a collision is avoided, the steering wheel 111 is displaced from the predetermined position to the original position. That is, the steering wheel 111 is reversibly displaced in accordance with the condition of the vehicle.

(13) When the predicted collision is avoided, the steering wheel 111 is automatically restored from the predetermined position to the original position. Therefore, after the predicted collision is avoided, the driver is permitted to drive in the normal manner.

(14) The displacement mechanism not only displaces the steering wheel 111 from the original position to the predetermined position but also from the predetermined position to the original position. That is, the displacement mechanism functions also as a restore mechanism, which restores the steering wheel 111 from the predetermined position to the original position. This simplifies the structure relating to the displacement of the steering wheel 111.

(15) Since the steering wheel 111 functions as the support body 123, the structure of the airbag apparatus is simplified.

A twelfth embodiment of the present invention will now be described. The differences from the eleventh embodiment will mainly be discussed below.

Figure 23:
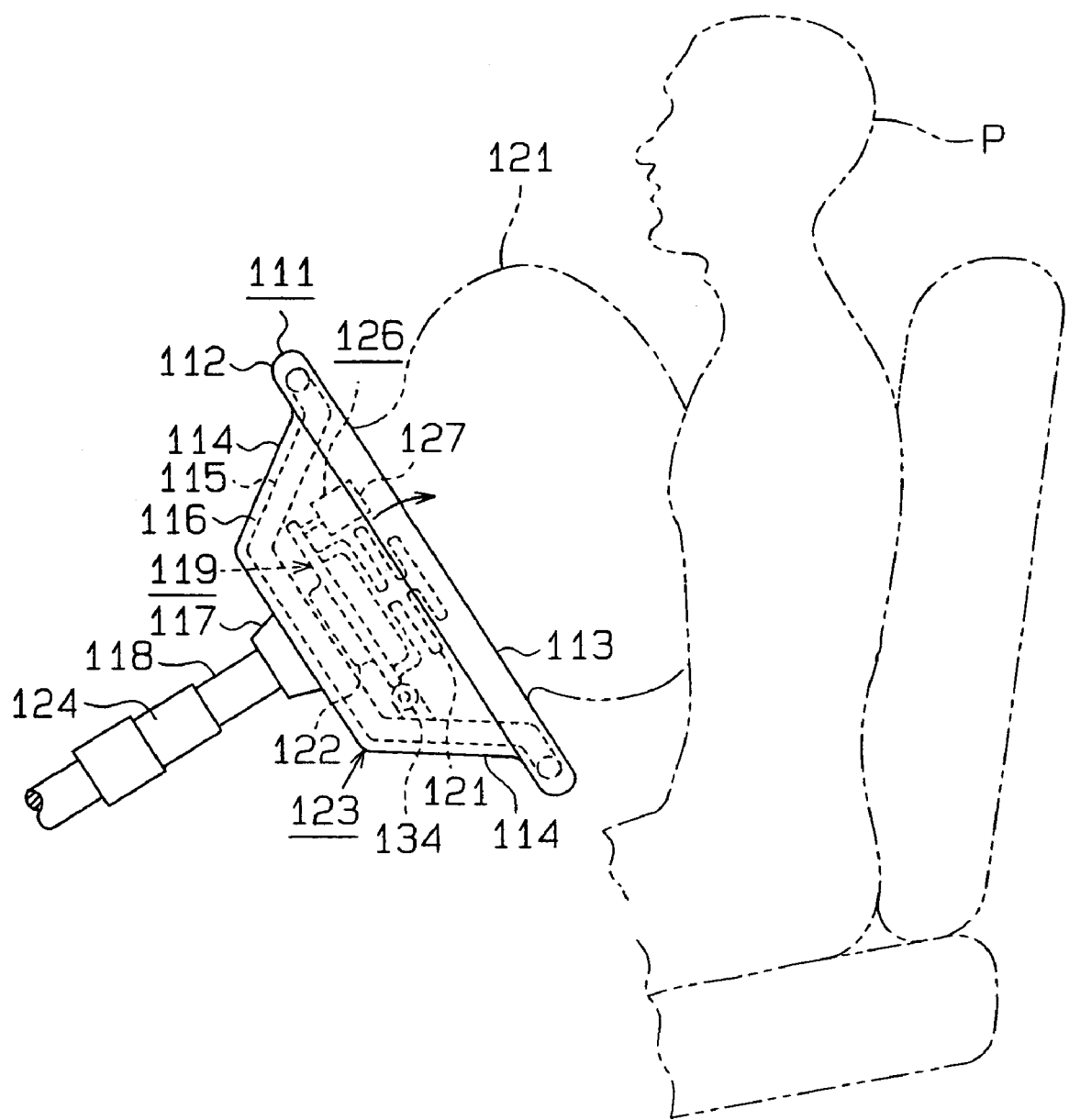
FIG. 23 is a side view illustrating an airbag apparatus according to a twelfth embodiment and the vicinity of the airbag apparatus.

As shown in FIG. 23, in the twelfth embodiment, the airbag module 119 and the solenoid 127 are located inside the pad portion 113 of the steering wheel 111. The airbag module 119 is coupled to the armature of the solenoid 127 and is displaced about a support shaft 134 in accordance with the extension and retraction of the armature. A displacement mechanism according to the twelfth embodiment is formed by the shifting mechanism 126, which includes the solenoid 127, and displaces the airbag module 119. In other words, the displacement mechanism changes the relative position between the steering wheel 111, or the support body 123, and the airbag module 119.

The airbag module 119 is normally located at an original position shown by a broken line in FIG. 23. If a collision is predicted by the pre-crash sensor 130, the controller 128 excites the solenoid 127 to retract the armature. Accordingly, the airbag module 119 is displaced in a direction shown by an arrow in FIG. 23 such that the deployment direction of the airbag 121 is oriented toward the chest of the occupant P.

If a collision is detected by the crash sensor 131 subsequently, the controller 128 actuates the inflator 122. The airbag 121 is then deployed toward the chest of the occupant P. The deployed airbag 121 is supported between the steering wheel 111 and the chest of the occupant P. On the other hand, if the predicted collision is avoided, the controller 128 extends the armature of the solenoid 127 and restores the airbag module 119 to the original position.

The twelfth embodiment provides the following advantages in addition to the advantage (15) of the eleventh embodiment.

(16) If a collision is predicted, the airbag module 119 is displaced with respect to the steering wheel 111 such that the deployed airbag 121 is supported between the steering wheel 111 and the chest of the occupant P. Therefore, the deployed airbag 121 is prevented from bouncing back from the chest of the occupant P and being displaced to an unsuitable position. Thus, the deployed airbag 121 effectively reduces the impact applied to the occupant P at the collision and reliably protects the occupant P from the impact of the collision.

(17) When the predicted collision is avoided, the airbag module 119 is displaced from the predetermined position to the original position. Therefore, the airbag module 119, which includes the undeployed airbag 121, is permitted to easily return to the original position and prepare for the future collision.

(18) The displacement mechanism not only displaces the airbag module 119 from the original position to the predetermined position but also from the predetermined position to the original position. That is, the displacement mechanism functions also as a restore mechanism, which restores the airbag module 119 from the predetermined position to the original position. This simplifies the structure relating to the displacement of the airbag module 119.

A thirteenth embodiment of the present invention will now be described. The differences from the eleventh embodiment will mainly be discussed below.

Figure 24:
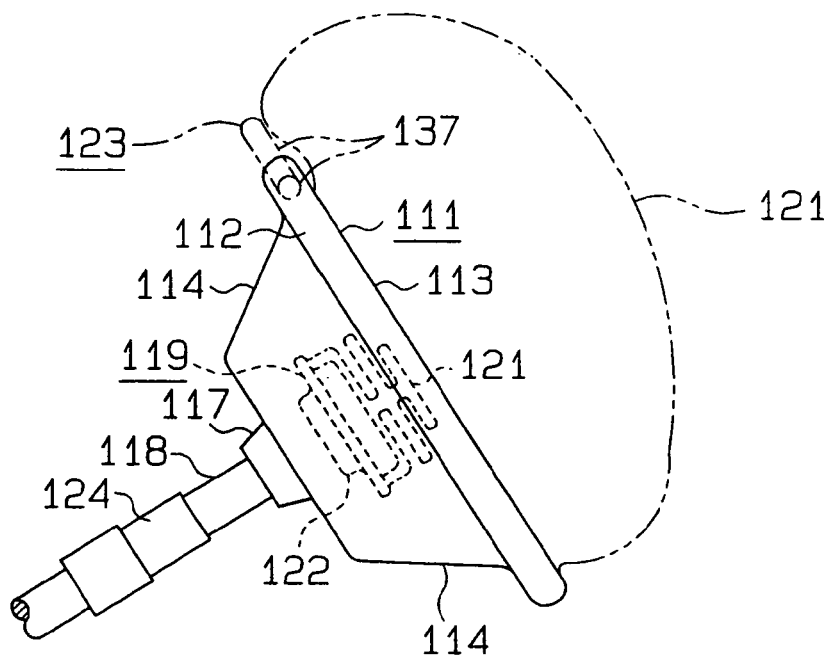
FIG. 24 is a side view illustrating an airbag apparatus according to a thirteenth embodiment and the vicinity of the airbag apparatus.
Figure 25:
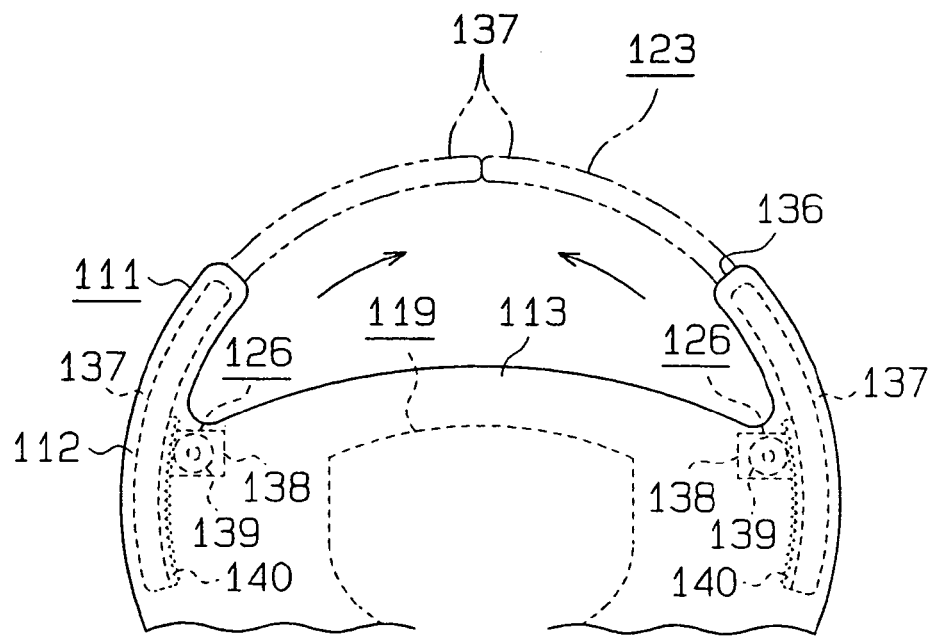
FIG. 25 is a partial front view illustrating the steering wheel shown in FIG. 24.

In the thirteenth embodiment, as shown in FIGS. 24 and 25, a blank portion 136 is formed by cutting out a part of the ring portion 112 of the steering wheel 111. The ring portion 112 of the steering wheel 111 has two ends oriented toward the blank portion 136. A pair of arcuate support members 137 is accommodated in the steering wheel 111. Each support member 137 is operably coupled to a rotary shaft of a motor 138 located inside the steering wheel 111 via a pinion 139 and a rack 140. Therefore, each support member 137 selectively projects from and retracts into the corresponding end of the steering wheel 111 in accordance with the rotation of the rotary shaft of the corresponding motor 138. The motors 138 are connected to the controller 128 instead of the solenoid 127 shown in FIG. 22.

The support body 123 according to the thirteenth embodiment includes the steering wheel 111 and the support members 137. A displacement mechanism is formed by the shifting mechanisms 126, each of which includes the motor 138, the pinion 139, and the rack 140, and displaces the corresponding support member 137.

The support members 137 are normally located at a retracted position inside the steering wheel 111, that is, an original position shown by a broken line in FIG. 25. If a collision is predicted by the pre-crash sensor 130, the controller 128 rotates the motors 138 so that the support members 137 project from the ends of the steering wheel 111 as shown by a chain double-dashed line in FIG. 25. Accordingly, the support members 137, which project from the ends of the steering wheel 111, abut against each other and fill the blank portion 136.

If a collision is detected by the crash sensor 131 subsequently, the controller 128 actuates the inflator 122. The airbag 121 is then deployed toward the chest of the occupant P. The deployed airbag 121 is supported among the steering wheel 111, the support members 137, and the chest of the occupant P. On the other hand, if the predicted collision is avoided, the controller 128 rotates the motors 138 to restore the support members 137 to the original position.

The thirteenth embodiment provides the following advantages.

(19) If a collision is predicted, the support members 137 are displaced such that the deployed airbag 121 is supported between the support members 137 and the chest of the occupant P. Therefore, the deployed airbag 121 is stably supported among the steering wheel 111, the support members 137, and the chest of the occupant P. Thus, the deployed airbag 121 is prevented from bouncing back from the chest of the occupant P and being displaced to an unsuitable position. Consequently, the deployed airbag 121 effectively reduces the impact applied to the occupant P at the collision and reliably protects the occupant P from the impact of the collision.

(20) If a collision is predicted, the support members 137 are displaced from the original position to the predetermined position and when the predicted collision is avoided, the support members 137 are displaced from the predetermined position to the original position. That is, the support members 137 are reversibly displaced in accordance with the condition of the vehicle.

(21) The displacement mechanism not only displaces the support members 137 from the original position to the predetermined position but also from the predetermined position to the original position. That is, the displacement mechanism functions also as a restore mechanism, which restores the support member 137 from the predetermined position to the original position. This simplifies the structure relating to the displacement of the support members 137.

A fourteenth embodiment of the present invention will now be described. The differences from the eleventh embodiment will mainly be discussed below.

In the fourteenth embodiment, the pre-crash sensor 130 is located on both sides of the vehicle. Each pre-crash sensor 130 emits ultrasonic wave or electric wave laterally from the vehicle to detect an object, such as another vehicle, approaching the vehicle from the corresponding side. The crash sensor 131 is located on both sides of the vehicle. When an impact greater than or equal to a predetermined value is applied to either side of the vehicle, the corresponding crash sensor 131 sends a signal representing the collision to the controller 128.

Figure 26:
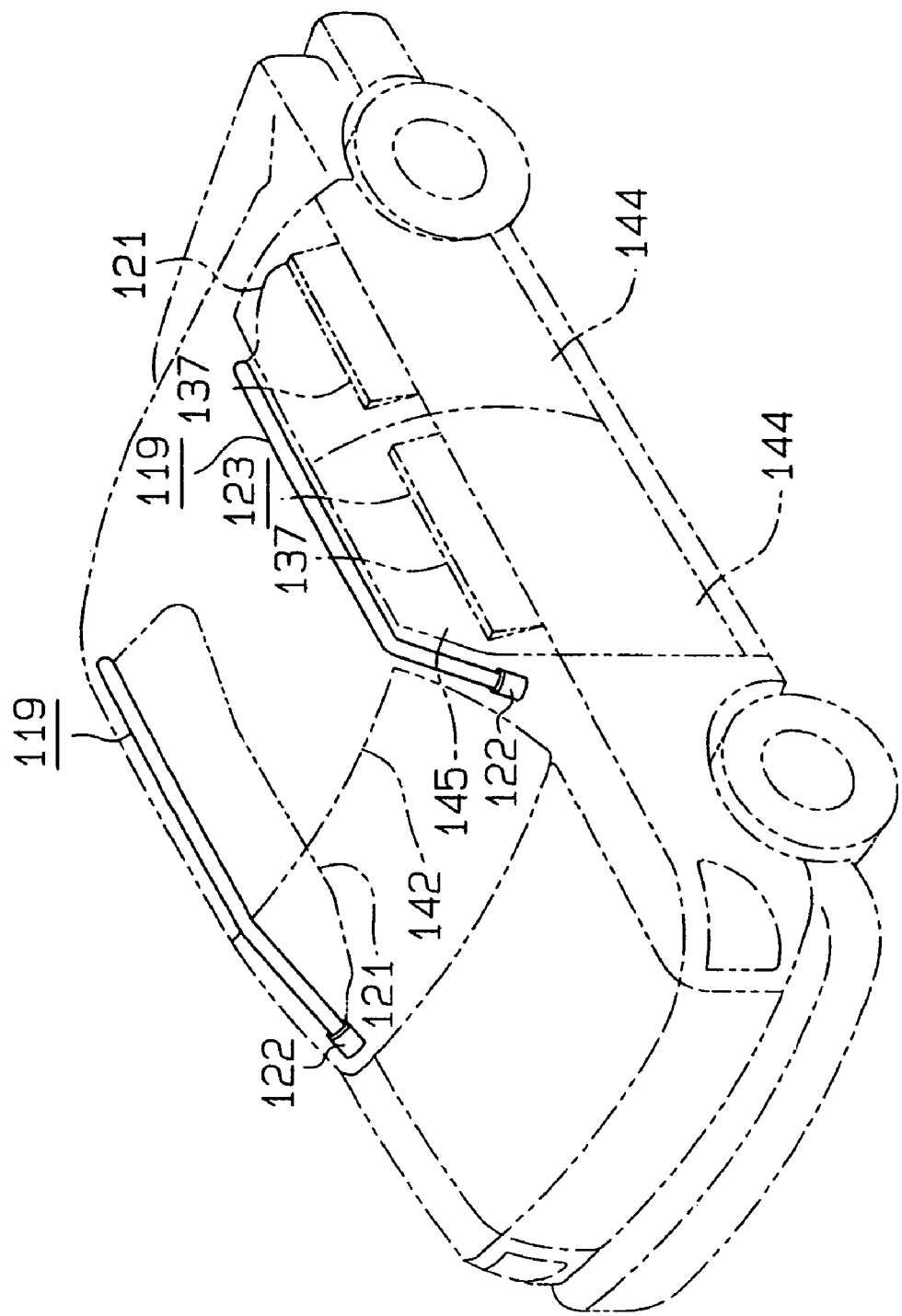
FIG. 26 is a perspective view illustrating a vehicle that has an airbag apparatus according to a fourteenth embodiment.
Figure 27:
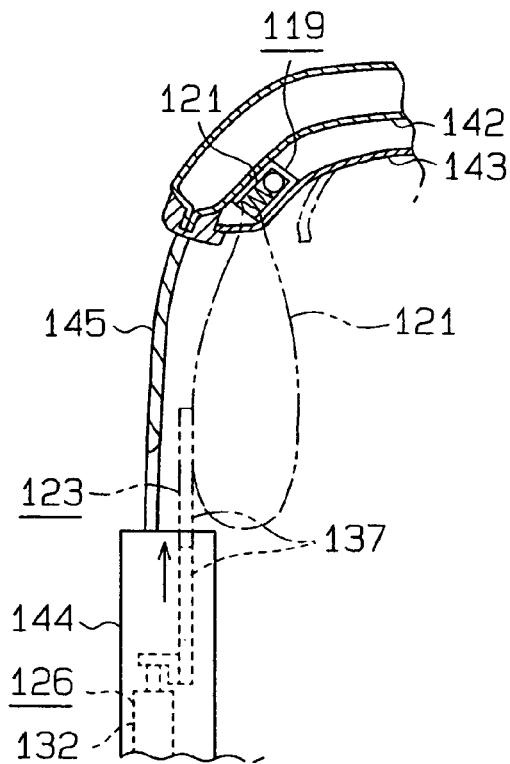
FIG. 27 is a cross-sectional view illustrating the airbag apparatus shown in FIG. 26 and the vicinity of the airbag apparatus.

As shown in FIGS. 26 and 27, two airbag modules 119 are located on the left and right sides of an inner roof 142 of the vehicle. The airbag modules 119 are covered by a headlining 143 from below. The vehicle has four doors 144 (only two are shown in FIG. 26). A side glass 145 is accommodated in each door 144, and the glass 145 and door 144 partly defines the vehicle passenger compartment. As shown by a chain double-dashed line in FIG. 27, the deployment direction of each airbag 121 is oriented in a direction parallel to the inner side of the side glasses 145 of the doors 144 on the corresponding side. The support member 137 in the fourteenth embodiment has a plate-like shape and is accommodated in each door 144. Each support member 137 is coupled to a mover of a linear motor 132 and moves vertically in accordance with the movement of the mover. The linear motors 132 are connected to the controller 128 instead of the solenoid 127 shown in FIG. 22.

In the fourteenth embodiment, the support members 137 function as the support body 123. A displacement mechanism according to the fourteenth embodiment is formed by the shifting mechanism 126, which includes the linear motor 132, and displaces the support members 137.

The support members 137 are normally located at an original position shown by a broken line in FIG. 27. Each support member 137 is accommodated in the corresponding door 144 in the original position. If a collision is predicted by the pre-crash sensor 130, the controller 128 moves the mover of each linear motor 132 so that the corresponding support member 137 projects from the associated door 144. Accordingly, each support member 137, which projects from the corresponding door 144, covers the side glass 145 of the corresponding door 144 from inside.

If a collision is detected by the crash sensor 131 subsequently, the controller 128 actuates the inflator 122. Then, each airbag 121 is deployed along the support member 137 that covers the side glass 145 of the corresponding door 144 from inside. Each deployed airbag 121 is supported between the corresponding support member 137 and the occupant P. On the other hand, if the predicted collision is avoided, the controller 128 moves the mover of each linear motor 132 to restore the corresponding support member 137 to the original position.

The fourteenth embodiment provides the following advantages in addition to the advantages (20) and (21) of the thirteenth embodiment.

(22) If a collision is predicted, each support member 137 is displaced such that the corresponding airbag 121 that has deployed is supported between the support member 137 and the occupant P. Therefore, each deployed airbag 121 is stably supported between the corresponding support member 137 and the occupant P and prevented from bouncing back from the occupant P and being displaced to an unsuitable position. Thus, each deployed airbag 121 effectively reduces the impact applied to the occupant P at the collision and reliably protects the occupant P from the impact of the collision. In addition, at the actual collision, each support member 137 covers the corresponding side glass 145 from the inside so that no force is directly applied to the side glass 145 from the inside of the vehicle passenger compartment.

A fifteenth embodiment of the present invention will now be described. The differences from the eleventh embodiment will mainly be discussed below.

Figure 28:
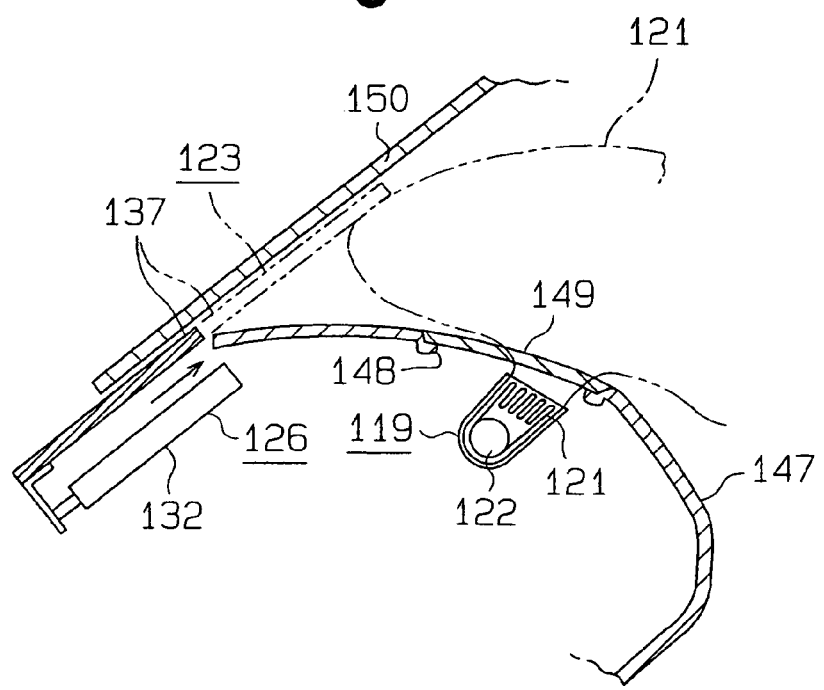
FIG. 28 is a cross-sectional view illustrating an airbag apparatus according to a fifteenth embodiment and the vicinity of the airbag apparatus.
Figure 29:
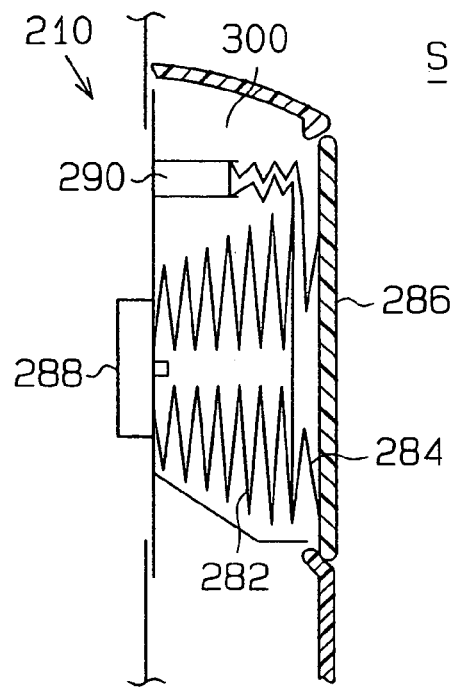
FIG. 29 is an enlarged partial cross-sectional view illustrating a prior art airbag apparatus in a non-activated state.
Figure 30:
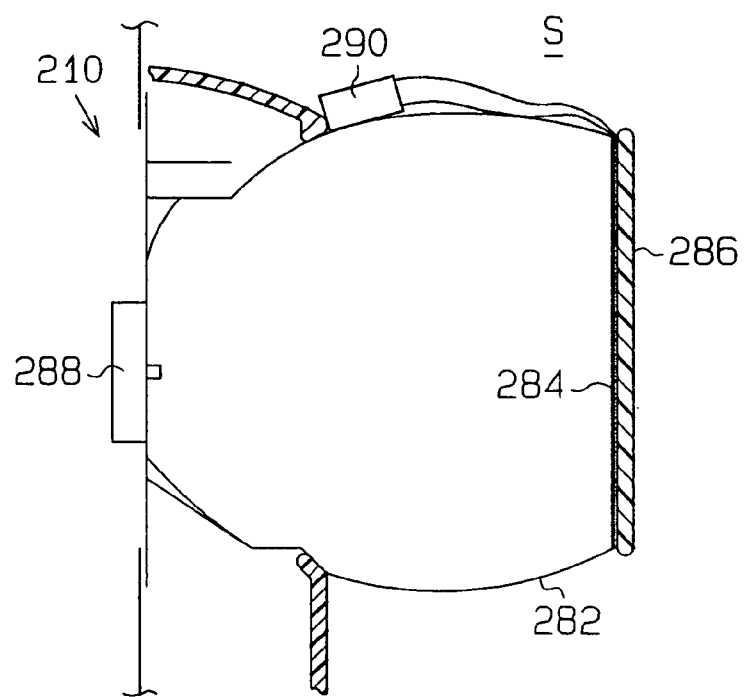
FIG. 30 is an enlarged partial cross-sectional view illustrating the airbag apparatus shown in FIG. 29 when a collision is predicted.
Figure 31:
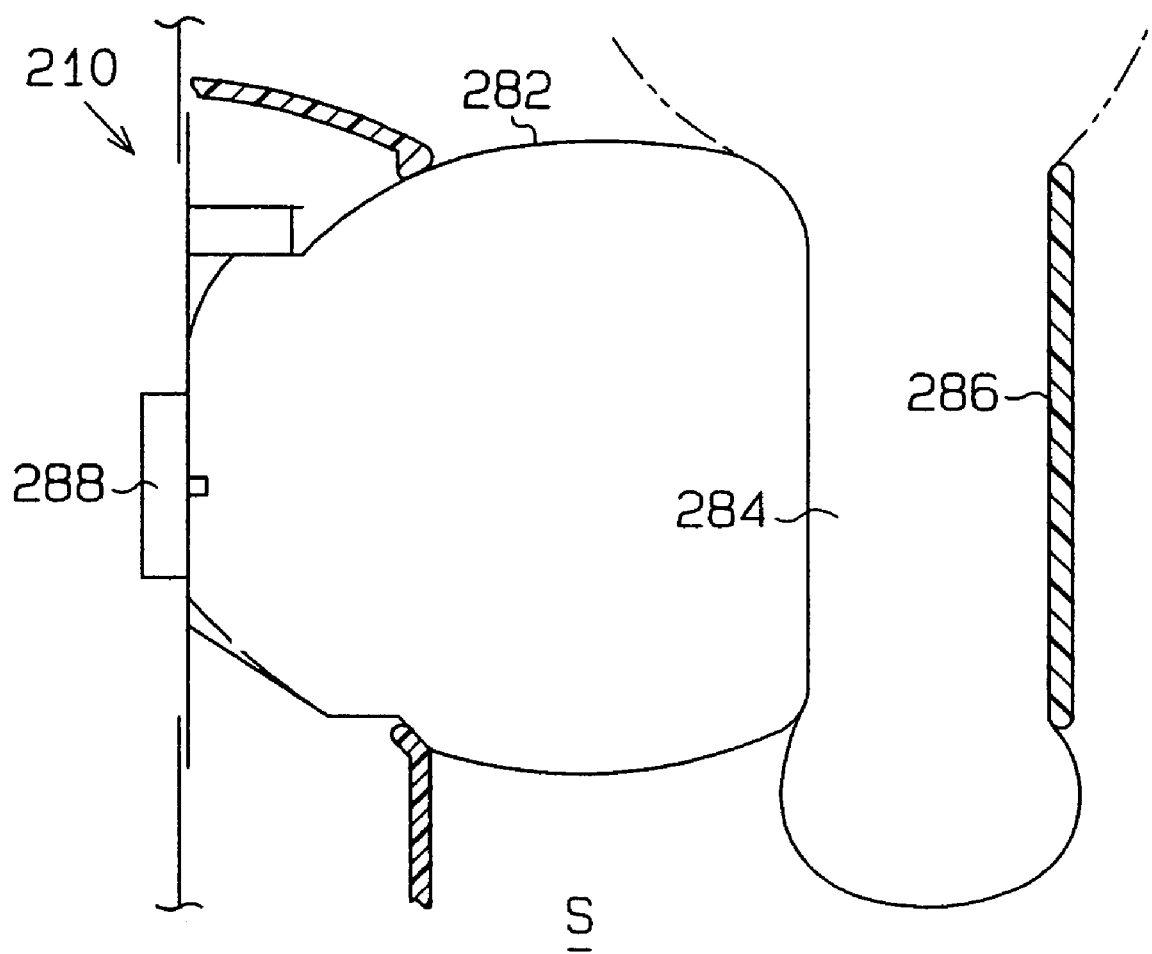
FIG. 31 is an enlarged partial cross-sectional view illustrating the airbag apparatus shown in FIG. 29 when a collision occurs.

As shown in FIG. 28, in the fifteenth embodiment, the airbag module 119 is accommodated inside an instrument panel 147 on the passenger's side. An opening 148 is located at a portion of the instrument panel 147 above the airbag module 119. The opening 148 is closed by a lid 149. When deployed, the airbag 121 pushes open the lid 149 and is exposed outside the instrument panel 147. The deployment direction of the airbag 121 is oriented toward the occupant P in the passenger's seat.

The support member 137 is also accommodated inside the instrument panel 147 on the passenger's side. The support member 137 is coupled to the mover of the linear motor 132 and projects from and retracts into the instrument panel 147 in accordance with the movement of the mover. The linear motor 32 is connected to the controller 128 instead of the solenoid 127 shown in FIG. 22.

In the fifteenth embodiment, the support member 137 functions as the support body 123. A displacement mechanism according to the fifteenth embodiment is formed by the shifting mechanism 126, which includes the linear motor 132, and displaces the support member 137.

The support member 137 is normally located at an original position, which is inside the instrument panel 147, shown by a solid line in FIG. 28. If a collision is predicted by the pre-crash sensor 130, the controller 128 moves the mover of the linear motor 132 so that the support member 137 projects from the instrument panel 147. Accordingly, the support member 137, which projects outside, covers a front glass 150 from inside as shown by a chain double-dashed line in FIG. 28. The front glass 150 partly defines the vehicle passenger compartment.

If a collision is detected by the crash sensor 131 subsequently, the controller 128 actuates the inflator 122. The airbag 121 is then deployed toward the occupant P in the passenger's seat. The deployed airbag 121 is supported between the support member 137 and the occupant P. On the other hand, if the predicted collision is avoided, the controller 128 moves the mover of the linear motor 132 to restore the support member 137 to the original position.

The fifteenth embodiment provides the following advantages in addition to the advantages (20) and (21) of the thirteenth embodiment and the advantage (22) of the fourteenth embodiment.

(23) The deployed airbag 121 is supported by not only the front glass 150 but also by the support member 137. Therefore, the deployed airbag 121 is stably supported by the support member 137 and the front glass 150. In addition, at the actual collision, the support member 137 covers the front glass 150 from the inside so that no force is directly applied to the front glass 150 from the inside of the vehicle passenger compartment.

It should be apparent to those skilled in the art that the present invention may be embodied in many other specific forms without departing from the spirit or scope of the invention. Particularly, it should be understood that the invention may be embodied in the following forms.

The displacement mechanism that displaces the airbag module 29, 119 or the support body 123 from the original position to the predetermined position may be separate from the displacement mechanism that restores the airbag module 29, 119 or the support body 123 from the predetermined position to the original position.

In the airbag apparatus shown in FIG. 13, the support plate 64 may be changed with a member that reciprocates forward and backward. In this case, the airbag module 29 approaches the legs of the occupant when a collision is predicted and separates from the legs of the occupant when the predicted collision is avoided in accordance with the extension and retraction of the armature of the solenoid. Therefore, if a collision is predicted, the airbag module 29 is located close to the legs of the occupant. Thus, although the airbag 31 is small, the airbag 31 reliably protects the occupant. If the airbag 31 is small, the size of the airbag module 29 is reduced, which is suitable for mounting the airbag module 29 in the instrument panel 63 or in the vicinity of the instrument panel 63.

In the airbag apparatus shown in FIG. 16, the airbag module 29 may be supported by a dedicated support member located below the instrument panel 63 instead of the under tray 70. In this case, the dedicated support member is coupled to the armature of the solenoid 49 and selectively moves forward and rearward.

In the airbag apparatus shown in FIG. 17, the rotary solenoid 60 may be supported by a dedicated support member located below the instrument panel 63 instead of the under tray 70.

In the above embodiments, the controller 40, 128 deploys the airbag 31, 121 if a collision is detected by the crash sensor 44, 131. However, the airbag 31, 121 may be deployed after a predetermined time from when the collision is predicted by the pre-crash sensor 43, 130. In this case, the crash sensor 44, 131 and the associated structure are unnecessary, which simplifies the structure. The controller 40, 128 may also be designed to deploy the airbag 31, 121 only when the pre-crash sensor 43 detects the object approaching the vehicle after a predetermined time from when the collision is predicted. In this case, a malfunction of the airbag apparatus is more reliably prevented.

In the above embodiments, the displacement mechanism for displacing the airbag module 29, 119 or the support body 123 from the predetermined position to the original position operates automatically if the predicted collision is avoided. However, the displacement mechanism may be designed to operate when, for example, a restore switch located inside the vehicle is pressed.

The motor 37 included in the shifting mechanism 30, 126, which forms the displacement mechanism, and other drive sources may be changed to other drive sources. For example, the solenoid 127 shown in FIG. 19 may be changed to a motor, and a rack and a pinion, which are operably coupled to the motor. The linear motor 132 shown in FIGS. 27 and 28 may be changed to a motor, and a rack and a pinion, which are operably coupled to the motor.

Therefore, the present examples and embodiments are to be considered as illustrative and not restrictive and the invention is not to be limited to the details given herein, but may be modified within the scope and equivalence of the appended claims.

The invention claimed is:

1. An airbag apparatus mounted to a vehicle, the apparatus comprising:
    an airbag, which is initially undeployed and which is selectively displaced between an original position and a predetermined position, wherein the airbag is located inside a vehicle passenger compartment on a steering wheel of the vehicle;
    an inflator, which supplies gas into the airbag to deploy the airbag in a deployment direction; and
    a displacement mechanism, which displaces the undeployed airbag from the original position to the predetermined position when a collision of the vehicle is predicted and which displaces the undeployed airbag from the predetermined position to the original position, and wherein the deployment direction of the airbag, when displaced to the predetermined position, is toward a driver of the vehicle.

2. The airbag apparatus according to claim 1, wherein the airbag and the inflator form one airbag module, and wherein the displacement mechanism displaces the airbag module.

* * * * *